US012627825B2

(12) United States Patent
Laroche et al.

(10) Patent No.: US 12,627,825 B2
(45) **Date of Patent: *May 12, 2026**

(54) VIDEO CODING AND DECODING

(71) Applicant: CANON KABUSHIKI KAISHA,
Tokyo (JP)

(72) Inventors: Guillaume Laroche, Saint Aubin
d'Aubigne (FR); Christophe Gisquet,
Acigne (FR); Patrice Onno, Rennes
(FR); Jonathan Taquet, Talensac (FR)

(73) Assignee: Canon Kabushiki Kaisha, Tokyo (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/760,709

(22) Filed: Jul. 1, 2024

(65) Prior Publication Data

US 2024/0357150 A1      Oct. 24, 2024

Related U.S. Application Data

(60) Continuation of application No. 17/752,677, filed on
May 24, 2022, now Pat. No. 12,058,360, which is a
division of application No. 17/275,091, filed as
application No. PCT/EP2019/075079 on Sep. 18,
2019, now Pat. No. 12,034,953.

(30) Foreign Application Priority Data

Sep. 21, 2018    (GB) ...................................... 1815444

(51) Int. Cl.
H04N 19/46 (2014.01)
H04N 19/105 (2014.01)
H04N 19/13 (2014.01)
H04N 19/176 (2014.01)

(52) U.S. Cl.
CPC .......... H04N 19/46 (2014.11); H04N 19/105
(2014.11); H04N 19/13 (2014.11); H04N
19/176 (2014.11)

(58) Field of Classification Search
CPC .... H04N 19/105; H04N 19/13; H04N 19/176;
H04N 19/46
See application file for complete search history.

(56) References Cited

U.S. PATENT DOCUMENTS

| 2013/0343461 A1* | 12/2013 | Lee ...................... H04N 19/136 |
| | | 375/240.16 |
| 2014/0086328 A1* | 3/2014 | Chen ...................... H04N 19/31 |
| | | 375/240.16 |
| 2019/0028731 A1* | 1/2019 | Chuang ................ H04N 19/176 |
| 2020/0267408 A1* | 8/2020 | Lee ...................... H04N 19/521 |
| 2021/0058637 A1* | 2/2021 | Zhang ................... H04N 19/52 |

FOREIGN PATENT DOCUMENTS

WO        2017118409 A1    7/2017

* cited by examiner

*Primary Examiner* — Zhubing Ren
(74) *Attorney, Agent, or Firm* — Canon U.S.A., Inc. IP
Division

(57) ABSTRACT

The invention relates to signalling affine mode in an encoded
video stream; in particular determining a list of merge
candidates corresponding to blocks neighbouring a current
block; and signalling affine mode for said current block;
wherein signalling said affine mode comprises decoding a
context encoded flag from the data stream, and wherein the
context variable for said flag is determined based on whether
or not said neighbouring blocks use affine mode. Related
encoding and decoding methods and devices are also dis-
closed.

14 Claims, 23 Drawing Sheets

1

VIDEO CODING AND DECODING

CROSS-REFERENCE TO RELATED APPLICATIONS

This application is a continuation application of U.S. patent application Ser. No. 17/752,677, filed on May 24, 2022, which is a divisional application of U.S. patent application Ser. No. 17/275,091, filed on Mar. 10, 2021, which is a National Phase application of PCT Application No. PCT/EP2019/075079, filed on Sep. 18, 2019 and titled "VIDEO CODING AND DECODING". This application claims the benefit under 35 U.S.C. § 119(a)-(d) of United Kingdom Patent Application No. 1815444.3, filed on Sep. 21, 2018. The above cited patent applications are incorporated herein by reference in their entirety.

FIELD OF INVENTION

The present invention relates to video coding and decoding.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include— but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools. A further tool not present in HEVC is to use an 'affine motion mode' when applying motion compensation. Motion compensation in HEVC is limited to translations, but in reality there are many kinds of motion, e.g. zoom in/out, rotation, perspective motions and other irregular motions. When utilising affine motion mode, a more complex transform is applied to a block to attempt to more accurately predict such forms of motion. However, use of an affine motion mode may add to the complexity of the encode/decode process and also may add to the signal overhead.

Accordingly, a solution to at least one of the aforementioned problems is desirable.

In a first aspect of the present invention there is provided a method of signalling a motion prediction mode for a portion of a bitstream, the method comprising: determining an inter prediction mode used for said portion of said bitstream; signalling affine motion mode in dependence on said inter prediction mode used in said portion of said bitstream.

Optionally, the inter prediction mode used is determined based on the status of a skip flag in said portion of said bitstream.

Optionally, affine mode is not enabled if said skip flag is present.

Optionally, the method further comprises enabling a merge mode when said affine mode is enabled.

Optionally, affine mode is enabled if said inter prediction mode is Advanced Motion Vector Predictor (AMVP).

Optionally, said determining is performed on the basis of a high level syntax flag, wherein said high level syntax flag indicates processing at least one of: slice level, frame level, sequence level, and Coding Tree Unit (CTU) level.

Optionally, determining an inter prediction mode comprises determining a mode of one or more blocks neighbouring a current block.

In a second aspect of the present invention there is provided a method of signalling a motion prediction mode in a bitstream, the method comprising: determining a mode of one or more neighbouring blocks to a current block; and in dependence on said mode(s), signalling affine motion mode for the current block Optionally, said neighbouring blocks consist solely of blocks A1 and B1.

Alternatively, said neighbouring blocks comprise blocks A2 and B3; preferably consisting solely of blocks A2 and B3.

Optionally, the method comprises enabling affine motion mode if one or both of said neighbouring blocks use affine motion mode.

Optionally, said neighbouring blocks further comprise B0, A0 and B2.

Optionally, the use of affine mode in said neighbouring blocks is determined in series and affine mode is enabled for the current block if one of said neighbouring blocks uses affine mode. Preferably, the series of the neighbouring blocks is A2, B3, B0, A0, B2.

In a third aspect of the present invention there is provided a method of signalling a motion prediction mode for a portion of a bitstream, the method comprising: determining a list of merge candidates corresponding to blocks neighbouring a current block; and enabling affine mode for said current block if one or more of said merge candidates use affine mode Optionally, said list starts with the blocks which have been used to determine a context variable relating to said block.

Optionally, the list starts with the blocks A2 and B3 in that order.

Optionally, the list is A2, B3, B0 or A0 or B2 in that order.

Optionally, affine mode is enabled for the current block if said neighbouring block(s) do not use merge mode.

Optionally, affine mode is enabled for the current block if said neighbouring block(s) do not use merge skip mode.

Optionally, signalling an affine mode comprises inserting a context encoded flag into the data stream, and wherein the context variable for said flag is determined based on whether or not neighbouring blocks use affine mode.

In a further aspect of the present invention there is provided a method of signalling a motion prediction mode for a block coded within a bitstream, the method comprising: determining whether or not blocks neighbouring said block coded within the bitstream use affine mode; and inserting a context encoded flag into the bitstream; wherein a context variable for said context encoded flag depends on said determining whether or not blocks neighbouring said block coded within the bitstream use affine mode.

Optionally, the neighbouring blocks comprise blocks A1 and B1.

Optionally, if the mode of the block for which a motion prediction mode is being enabled is a merge mode, said neighbouring blocks comprise blocks A1 and B1.

Optionally, the context for the affine flag is obtained according to the following formula: Ctx=IsAffine(A1)+IsAffine(B1) where Ctx is the context variable for the affine flag and IsAffine is a function which returns 0 if the block is not an affine block and 1 if the block is affine.

In a fourth aspect of the present invention there is provided a method of signalling a motion prediction mode for a block coded within a bitstream depending on whether or not neighbouring blocks use merge mode and/or merge skip mode.

In a fifth aspect of the present invention there is provided a method of signalling a motion prediction mode in a bitstream, the method comprising: compiling a list of candidate motion predictors; and inserting affine merge mode as a merge candidate Optionally, the affine merge mode candidate is after neighbouring block motion vectors in the list of merge candidates.

Optionally, the affine merge mode candidate is before an Alternative Temporal Motion Vector Predictor (ATMVP) candidate in the list of merge candidates.

Optionally, the position (merge index) of affine merge mode candidate in said list of candidates is fixed.

Optionally, the position of affine merge mode candidate in said list of candidates is variable.

Optionally, the position of the affine merge mode candidate is determined based on one or more of: a) the status of a skip flag; b) motion information of neighbouring blocks; c) an Alternative Temporal Motion Vector Predictor (ATMVP) candidate; and d) whether or not neighbouring blocks use affine mode.

Optionally, the affine merge mode is placed lower in said list of candidates (assigned a higher merge index) if one or more of the following conditions are met: a) a skip flag is present; b) motion information of neighbouring blocks are equal; c) an ATMVP candidate contains only one motion information; and d) more than one neighbouring blocks uses affine mode.

Optionally, said neighbouring blocks comprise blocks A1 and B1.

Optionally, the affine merge mode is placed lower in said list of candidates (assigned a higher merge index) than a spatial motion vector candidate if one or more of conditions a)-d) above are met.

Optionally, the affine merge mode is placed lower (assigned a higher merge index) than a temporal motion vector candidate if one or more of conditions a)-d) above are met.

Optionally, the affine merge mode is assigned a merge index related to the number of neighbouring blocks which use affine mode.

Optionally, the affine merge mode is assigned a merge index equal to 5 minus the amount of neighbouring blocks which use affine mode among the five A1, B1, B0, A0, B2.

According to another aspect of the present invention there is provided a method of signalling an affine motion mode in a bitstream, the method comprising: determining whether the likelihood of affine mode being used for a current block; compiling a list of candidate motion predictors; inserting affine merge mode as a merge candidate in dependence on said determining the likelihood of affine mode for said current block.

Optionally, said likelihood is determined based on at least one of: a) the status of a skip flag; b) motion information of neighbouring blocks; and c) an ATMVP candidate.

Optionally, affine merge mode is not inserted as a merge candidate if one or more of the following conditions are met: a) the status of a skip flag; b) motion information of neighbouring blocks is equal; and c) an ATMVP candidate contains only one motion information.

Optionally, said neighbouring blocks comprise blocks A1 and B1.

Optionally, affine mode is signalled in dependence of a feature of a device used to record video corresponding to the bitstream being encoded.

The aspects of the invention provide improvements to coding efficiency and/or a reduction in coding complexity compared to existing coding standards or proposals. In such a way a more efficient, faster video encoding and/or decoding method and system is provided.

Further aspects of the present invention relate to encoding and decoding methods using the methods of any of the above aspects.

Yet further aspects of the present invention relate to a device for signalling use of an affine mode in a bitstream representing an encoded video.

Yet further aspects of the present invention relate to an encoder and a decoder.

The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Yet further aspects of the present invention relate to a peripheral device such as a camera or mobile device.

Optionally, the camera further comprises zooming means and may be adapted to indicate when said zooming means is operational and signal affine mode in dependence on said indication that the zooming means is operational.

Optionally, the camera further comprises panning means and may be adapted to indicate when said panning means is operational and signal affine mode in dependence on said indication that the panning means is operational.

Optionally, the mobile device further comprising at least one positional sensor adapted to sense a change in orientation of the mobile device and may be adapted to signal affine mode in dependence on said sensing a change in orientation of the mobile device.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

Reference will now be made, by way of example, to the accompanying drawings, in which.

Figure 6A:
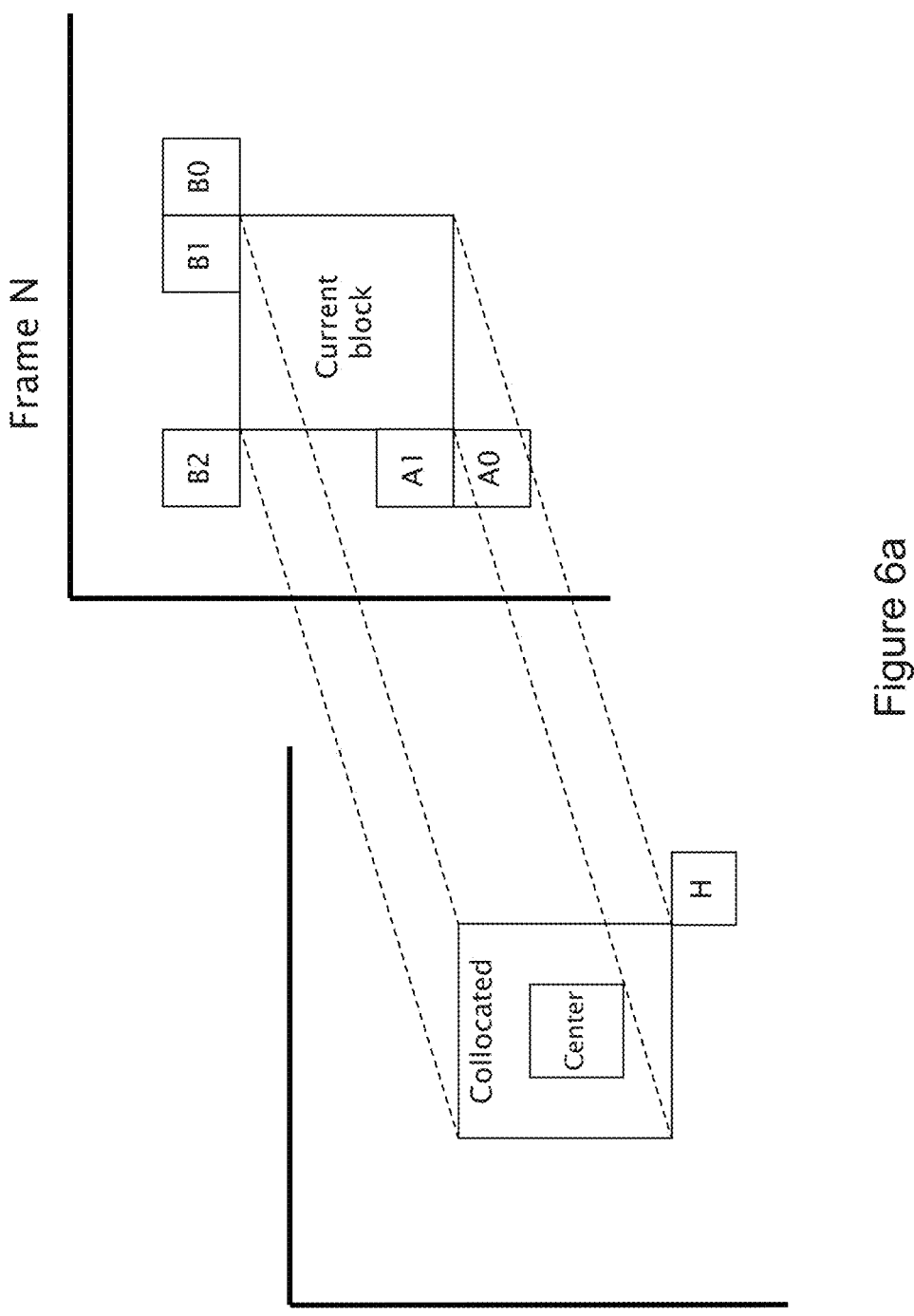
Figure 6B:
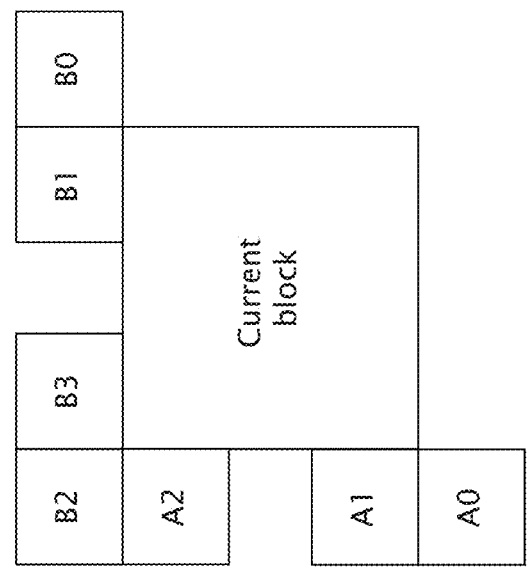
Figure 7:
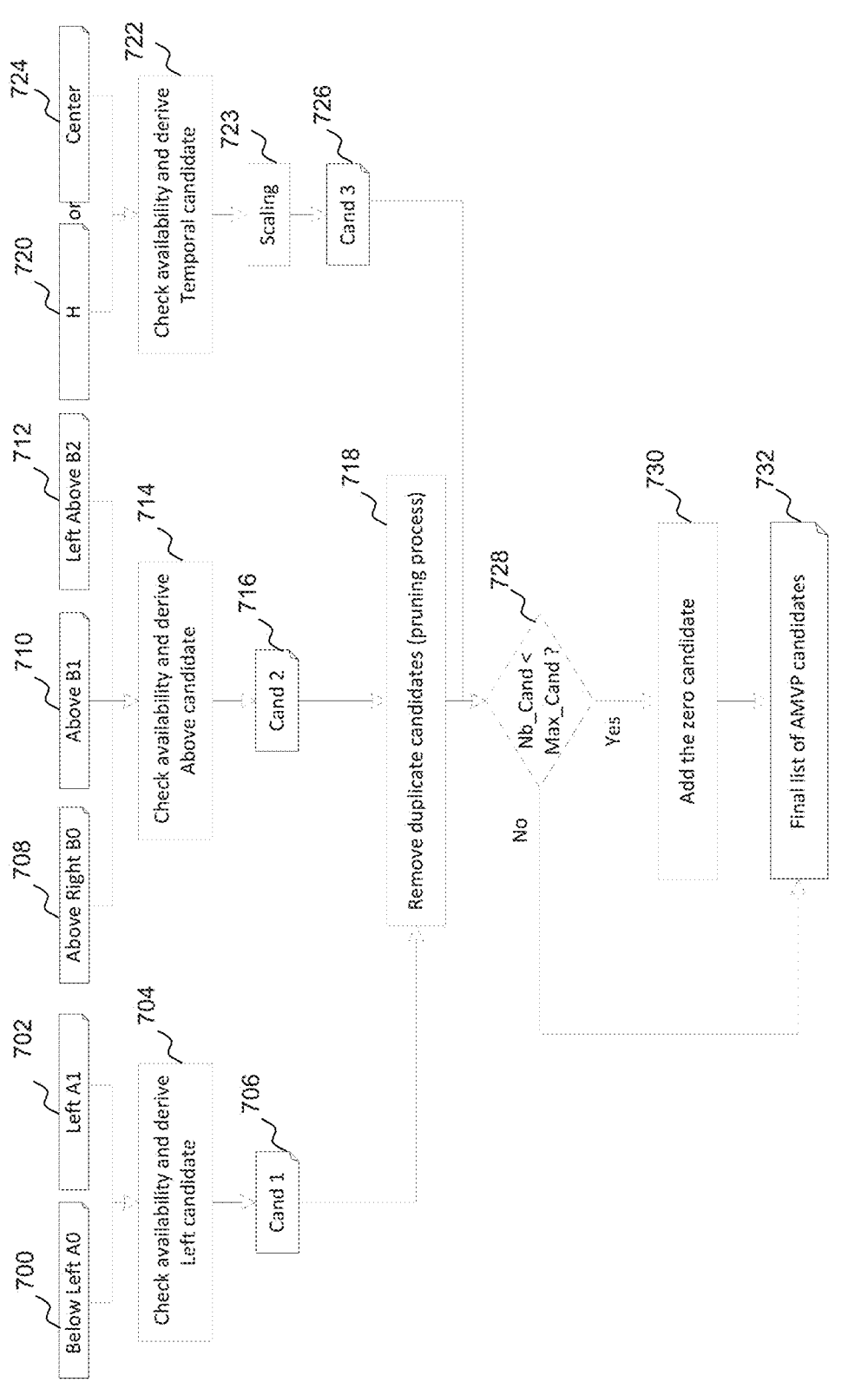
Figure 8:
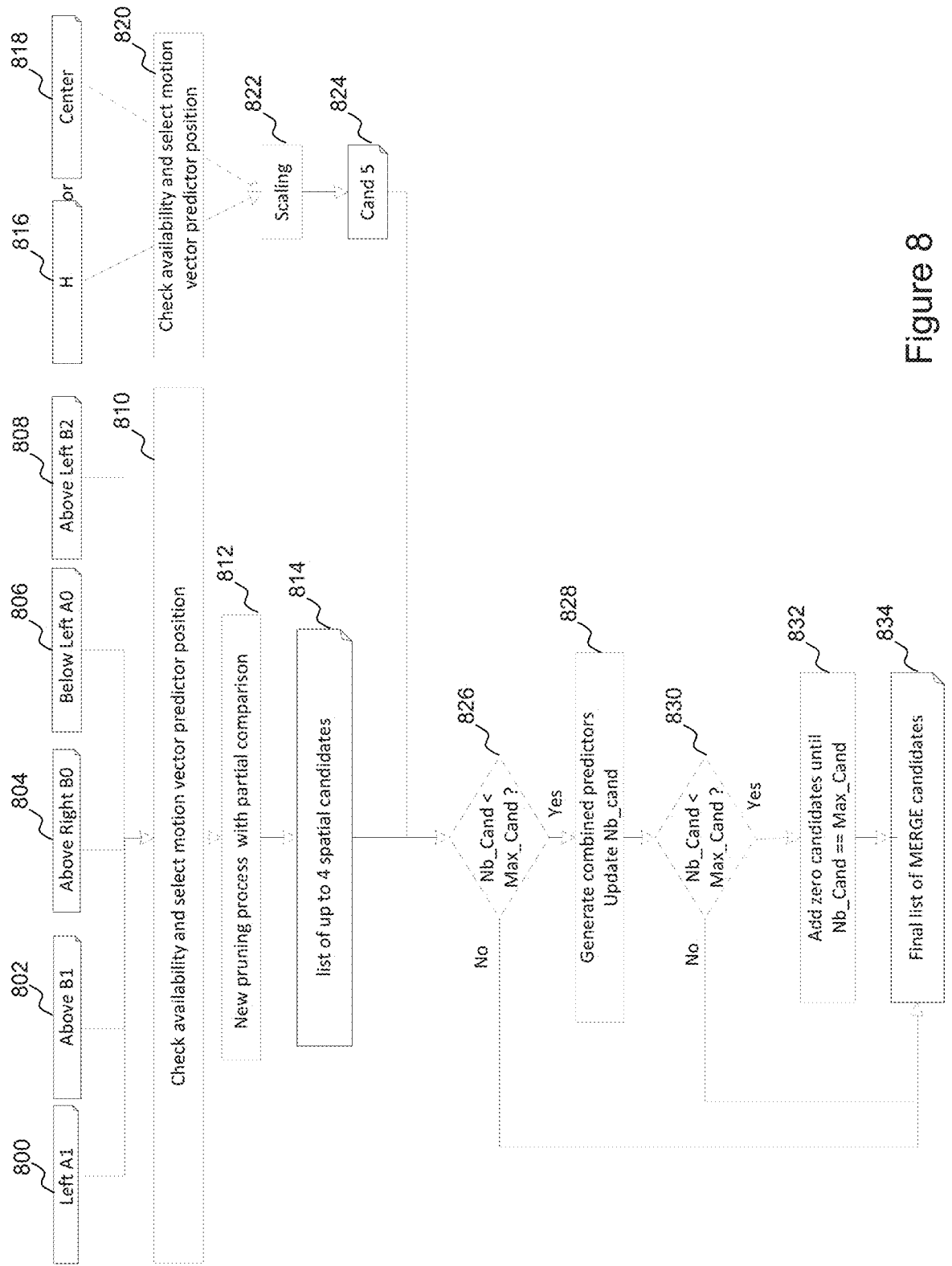
Figure 9:
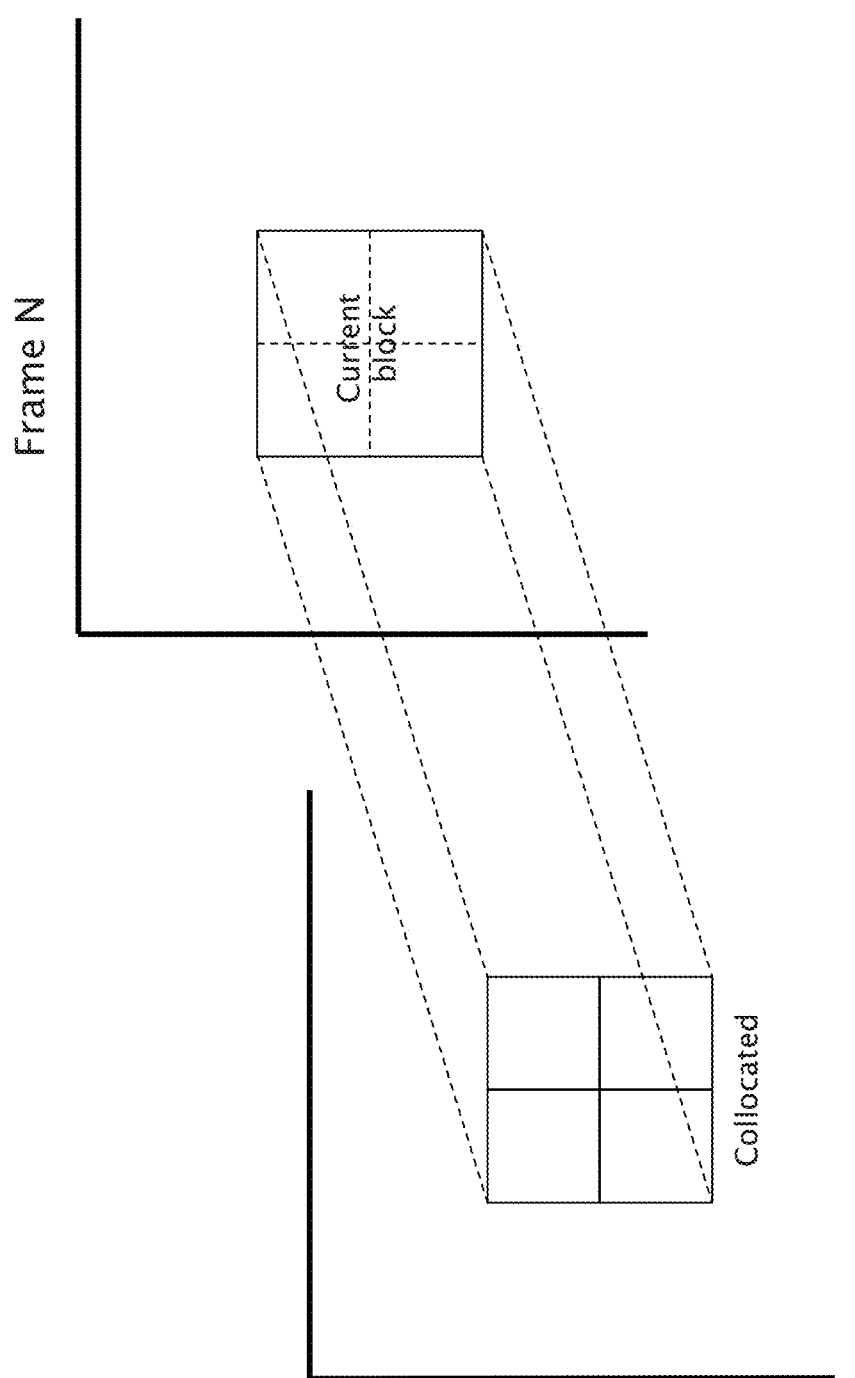
Figures 10A, 10B:
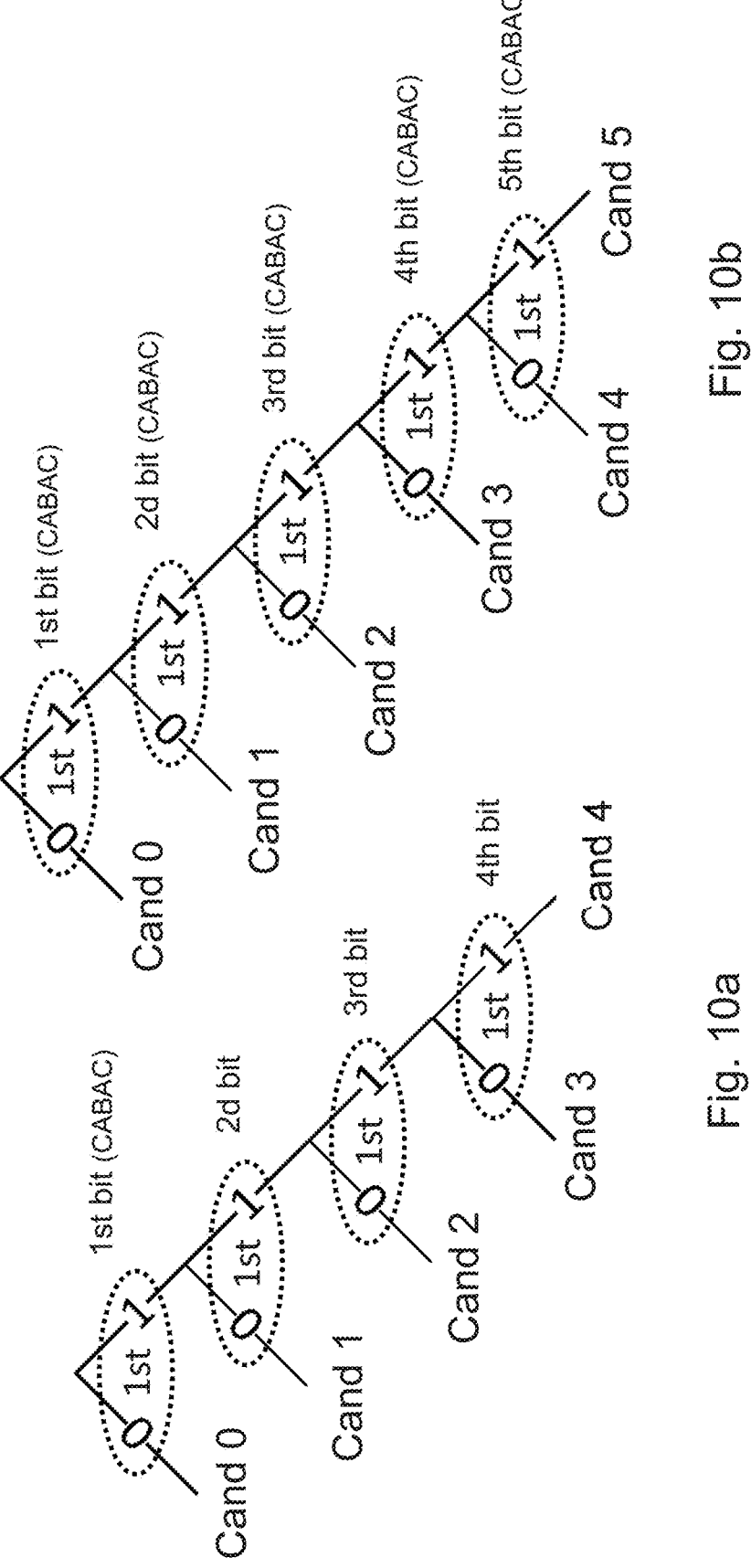
Figure 11B:
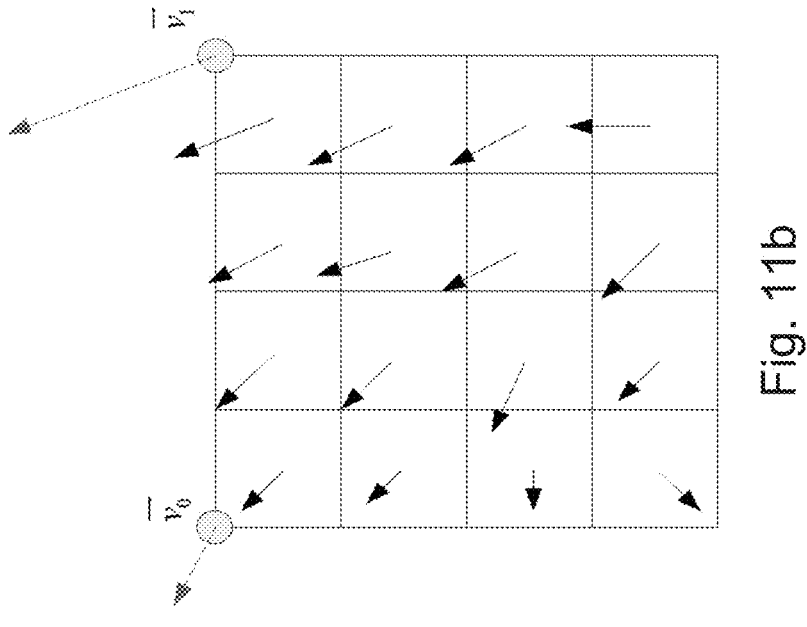
Figure 11A:
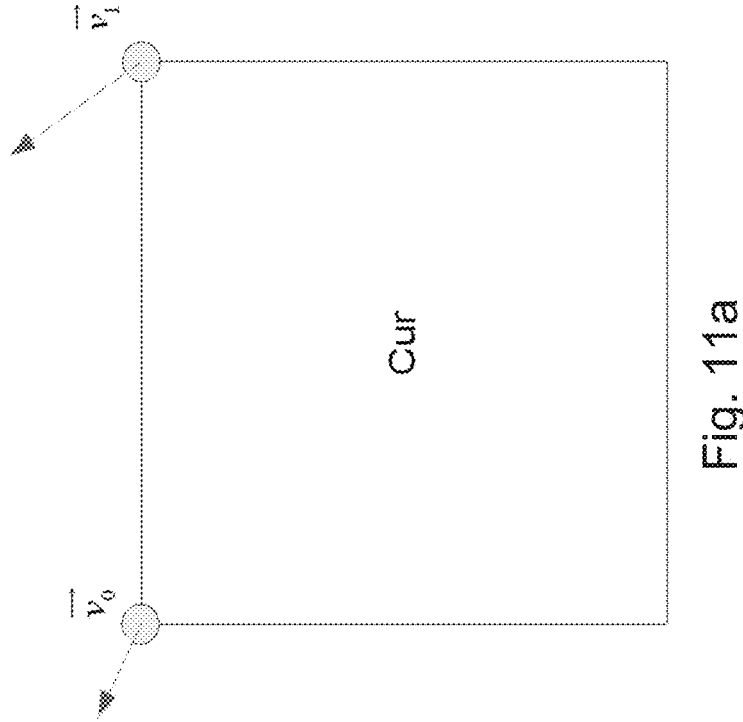
Figure 12:
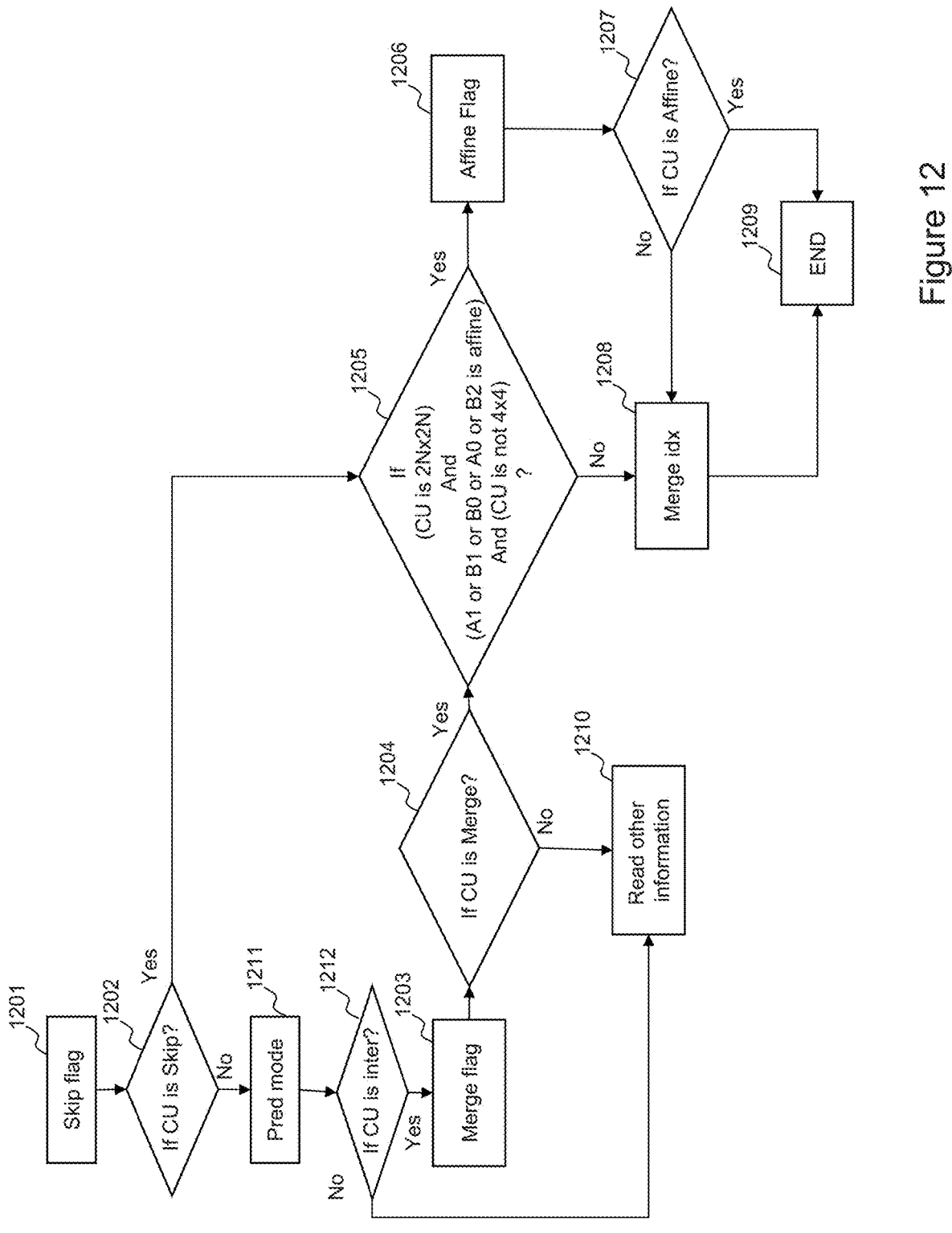
Figure 13:
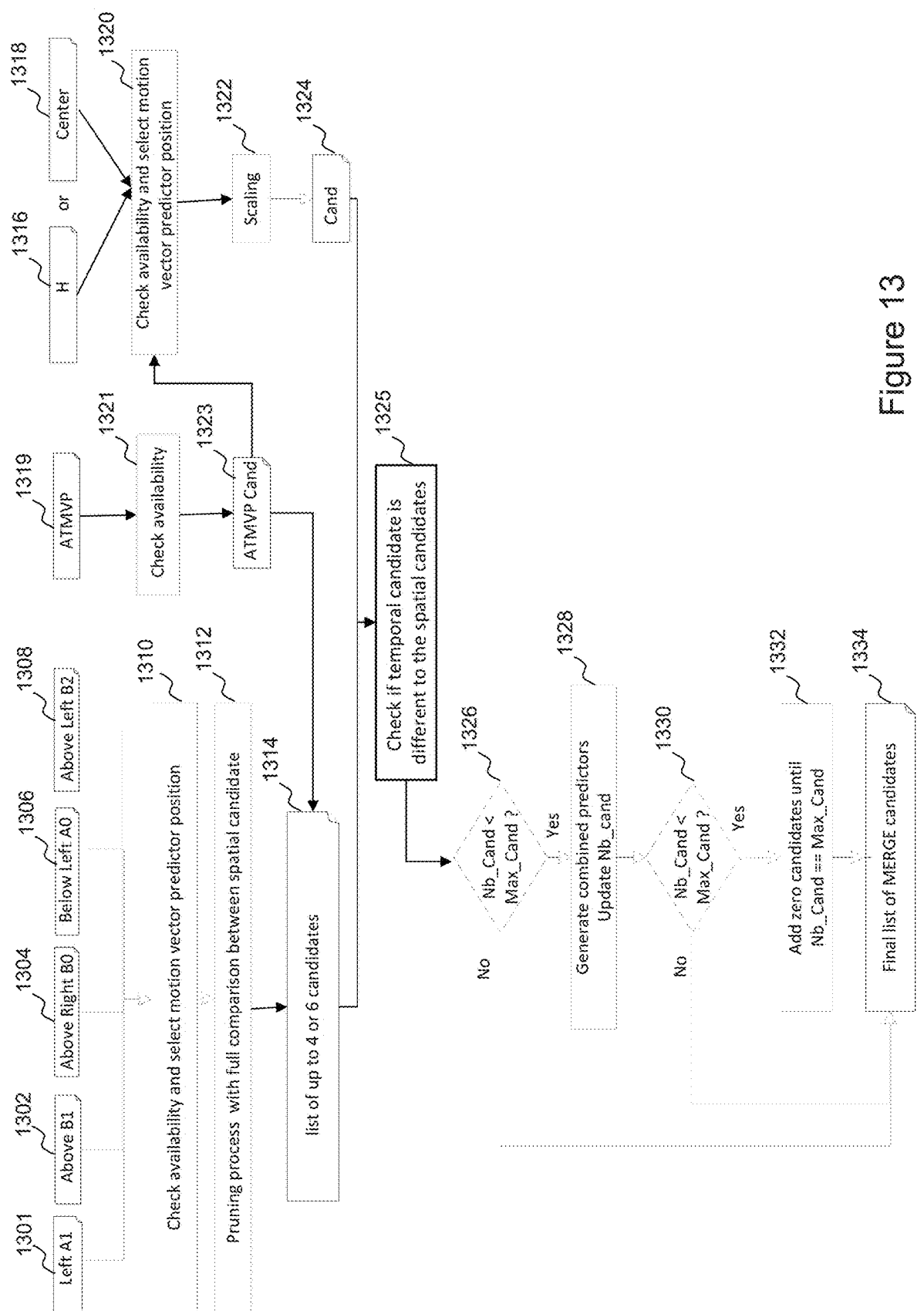
Figure 14:
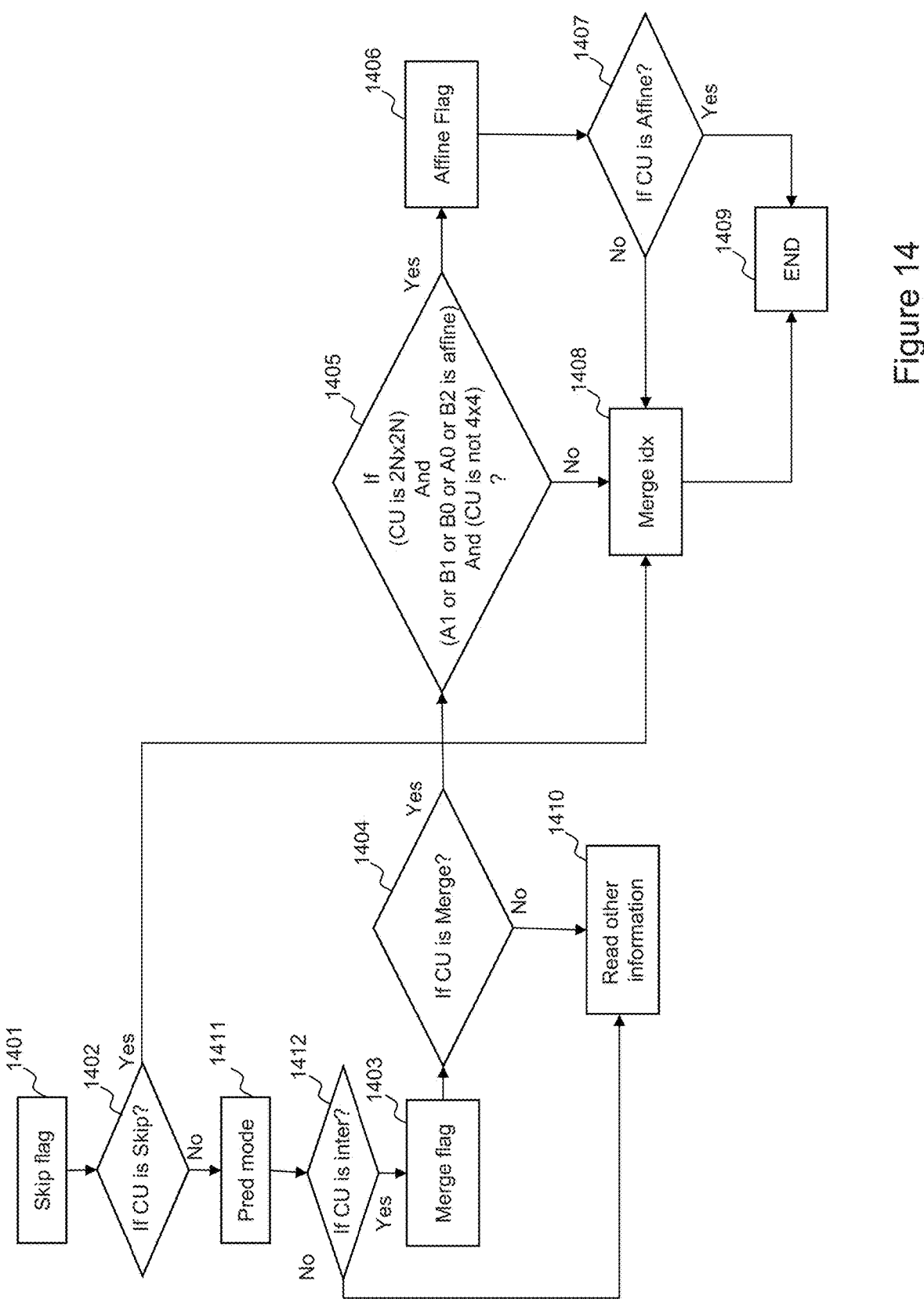
Figure 15:
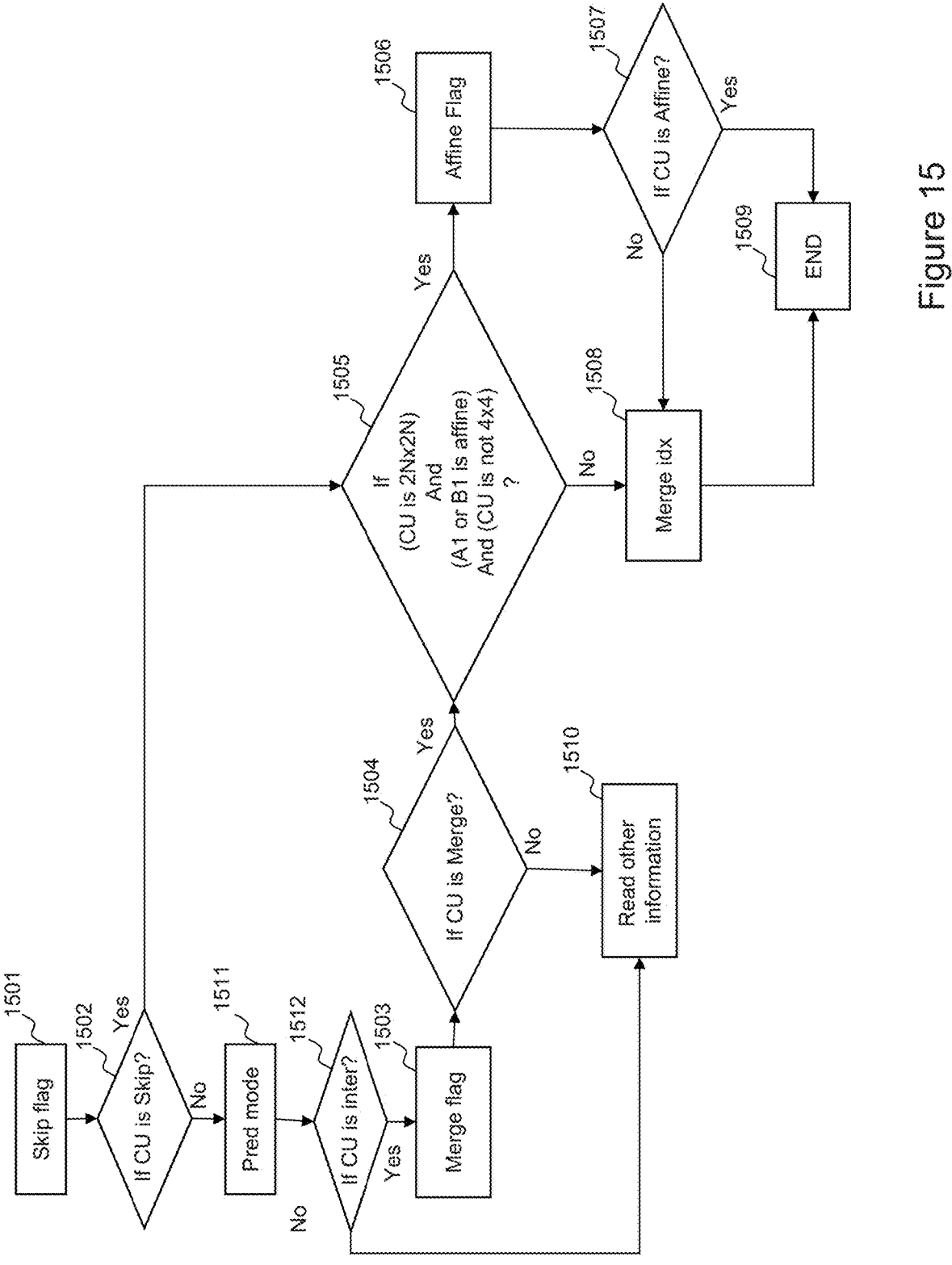
Figure 16:
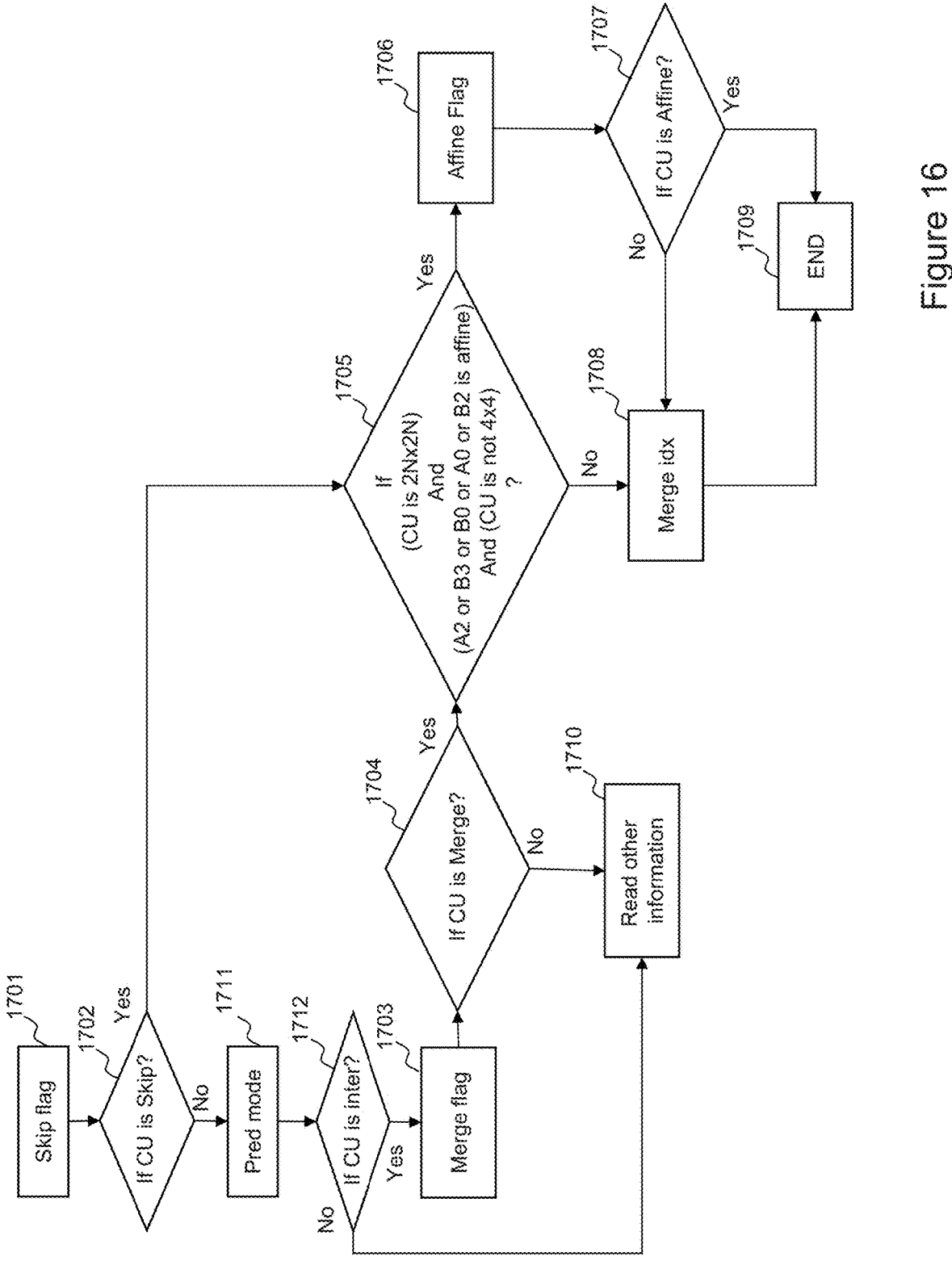
Figure 17:
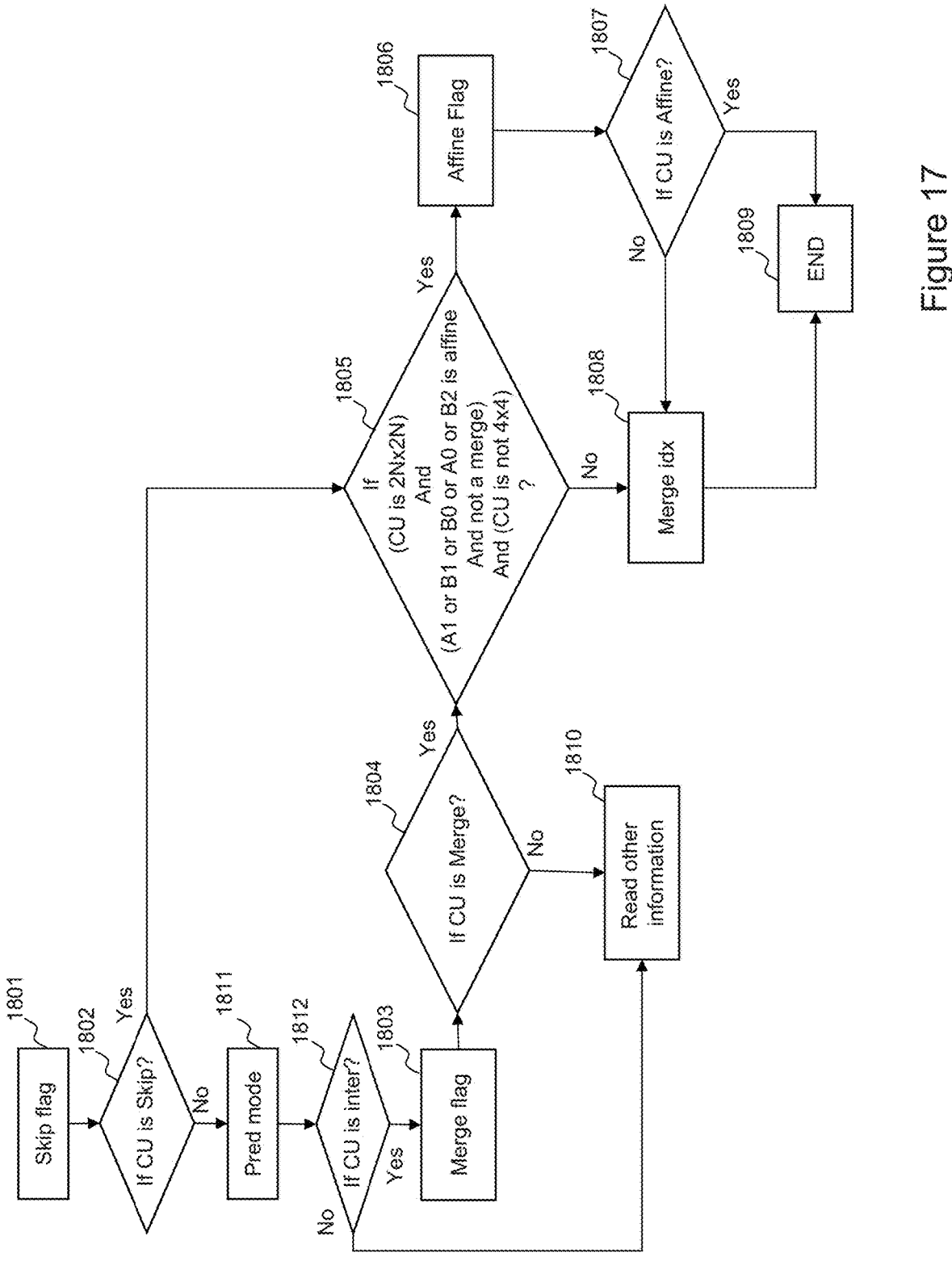
Figure 18:
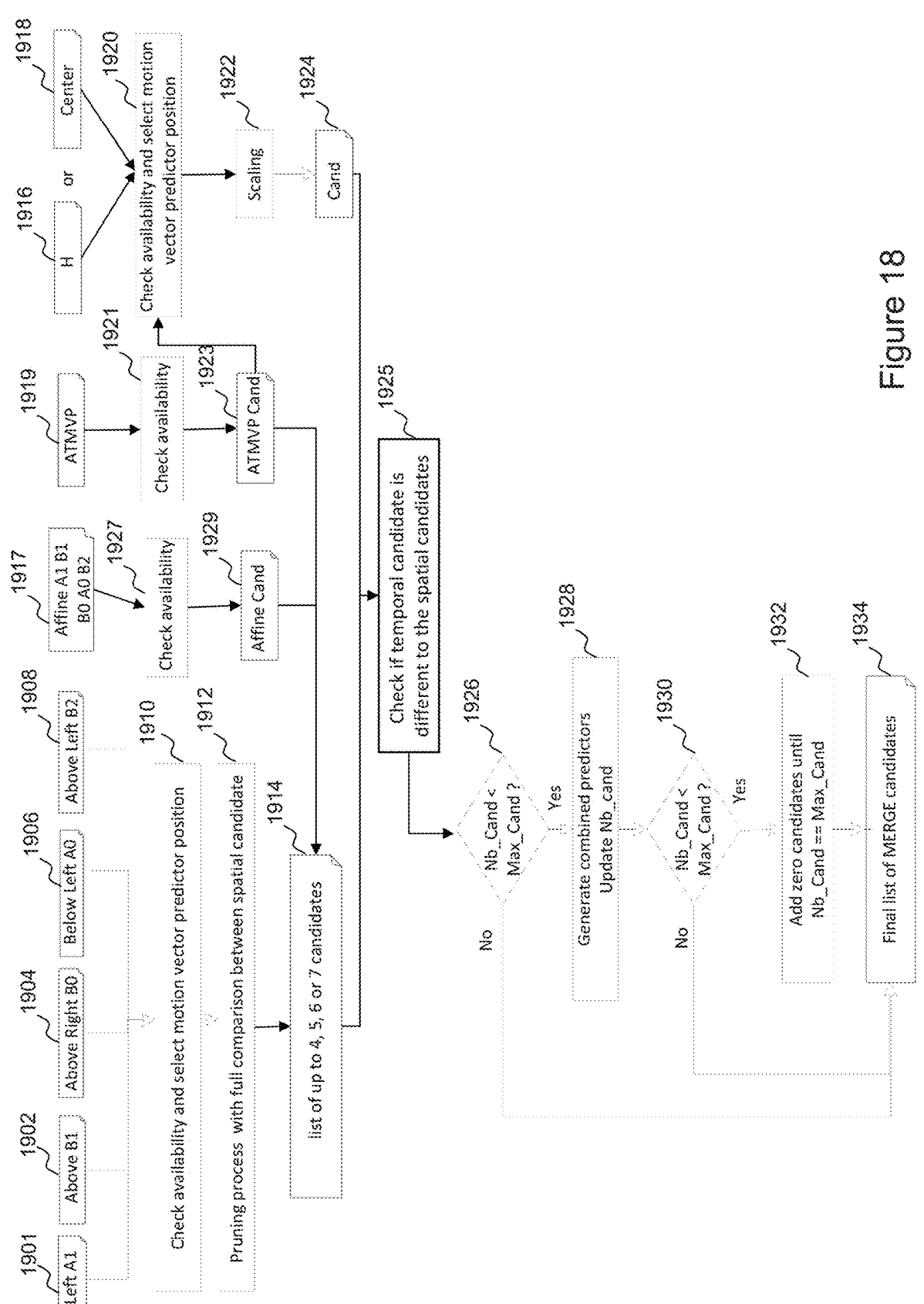
Figure 19:
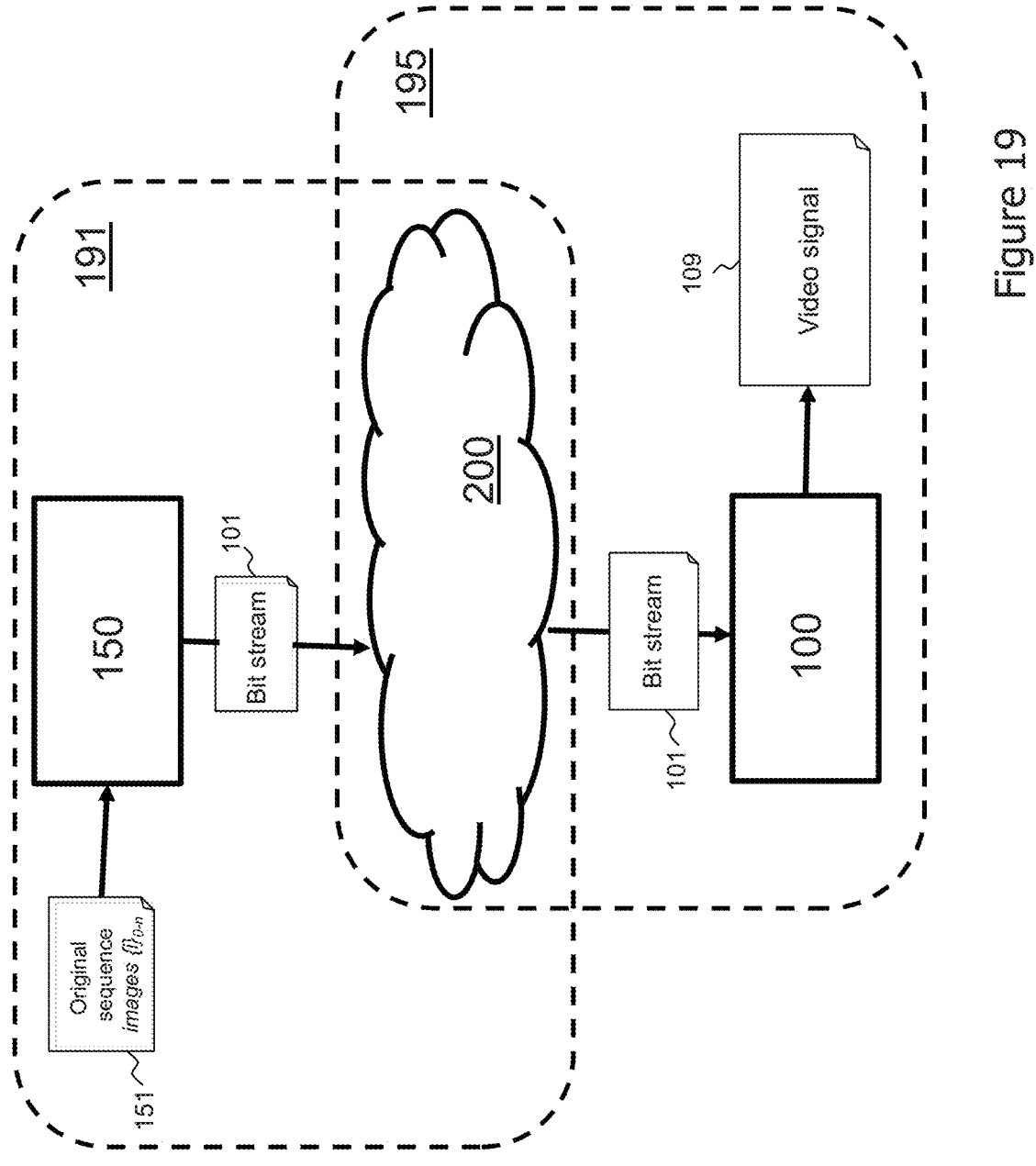
Figure 20:
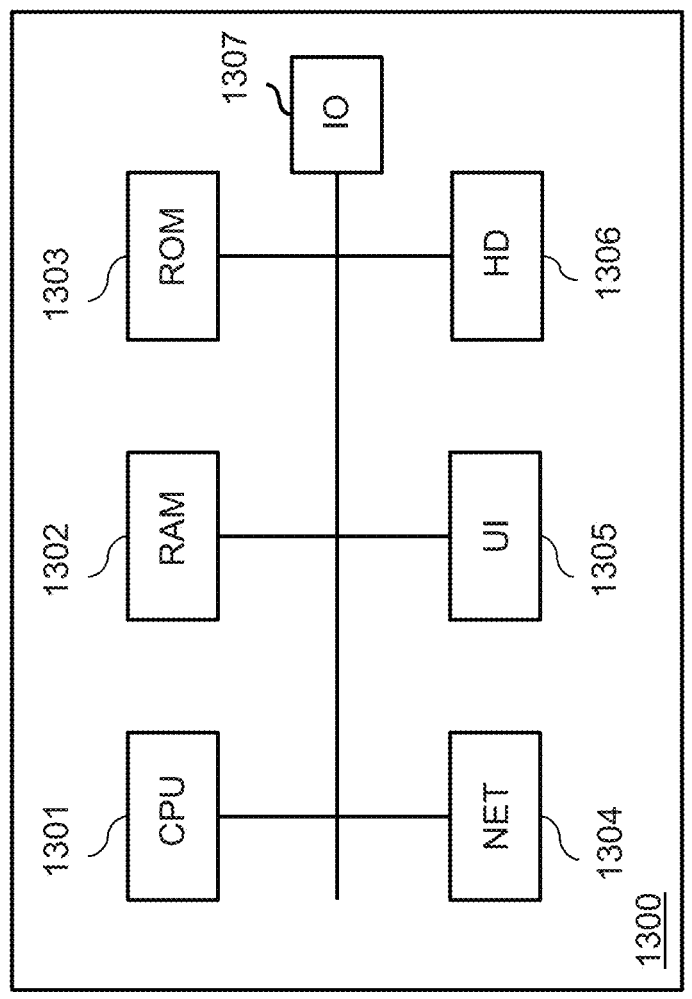
Figure 21:
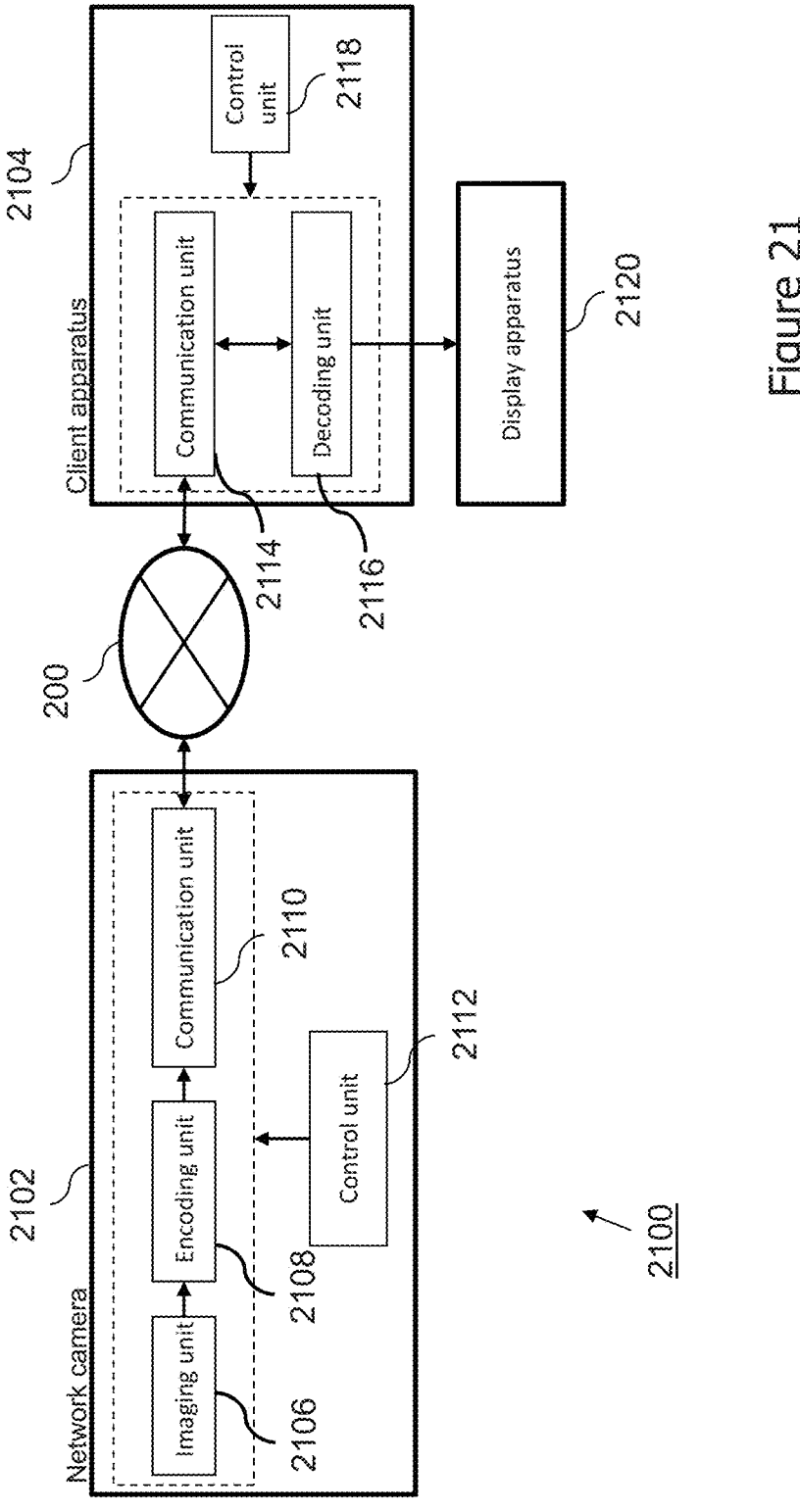

FIGS. 6(a) and 6(b) illustrate spatial and temporal blocks that can be used to generate motion vector predictors;

FIG. 7 shows simplified steps of the process of an AMVP predictor set derivation;

FIG. 8 is a schematic of a motion vector derivation process of the Merge modes;

FIG. 9 illustrates segmentation of a current block and temporal motion vector prediction;

FIG. 10(a) illustrates the coding of the Merge index for HEVC, or when ATMVP is not enabled at SPS level;

FIG. 10(b) illustrates the coding of the Merge index when ATMVP is enabled at SPS level;

FIG. 11(a) illustrates a simple affine motion field;

FIG. 11(b) illustrates a more complex affine motion field;

FIG. 12 is a flow chart of the partial decoding process of some syntax elements related to the coding mode;

FIG. 13 is a flow chart illustrating Merge candidates derivation;

FIG. 14 is a flow chart illustrating a first embodiment of the invention;

FIG. 15 is a flow chart illustrating a second embodiment of the invention;

FIG. 16 is a flow chart illustrating a third embodiment of the invention;

FIG. 17 is a flow chart illustrating a fourth embodiment of the invention;

FIG. 18 is a flow chart illustrating a fifth embodiment of the invention;

FIG. 19 is a schematic block diagram of a computing device for implementation of one or more embodiments of the invention;

FIG. 20 is a schematic block diagram of a computing device;

FIG. 21 is a diagram illustrating a network camera system; and

Figure 22:
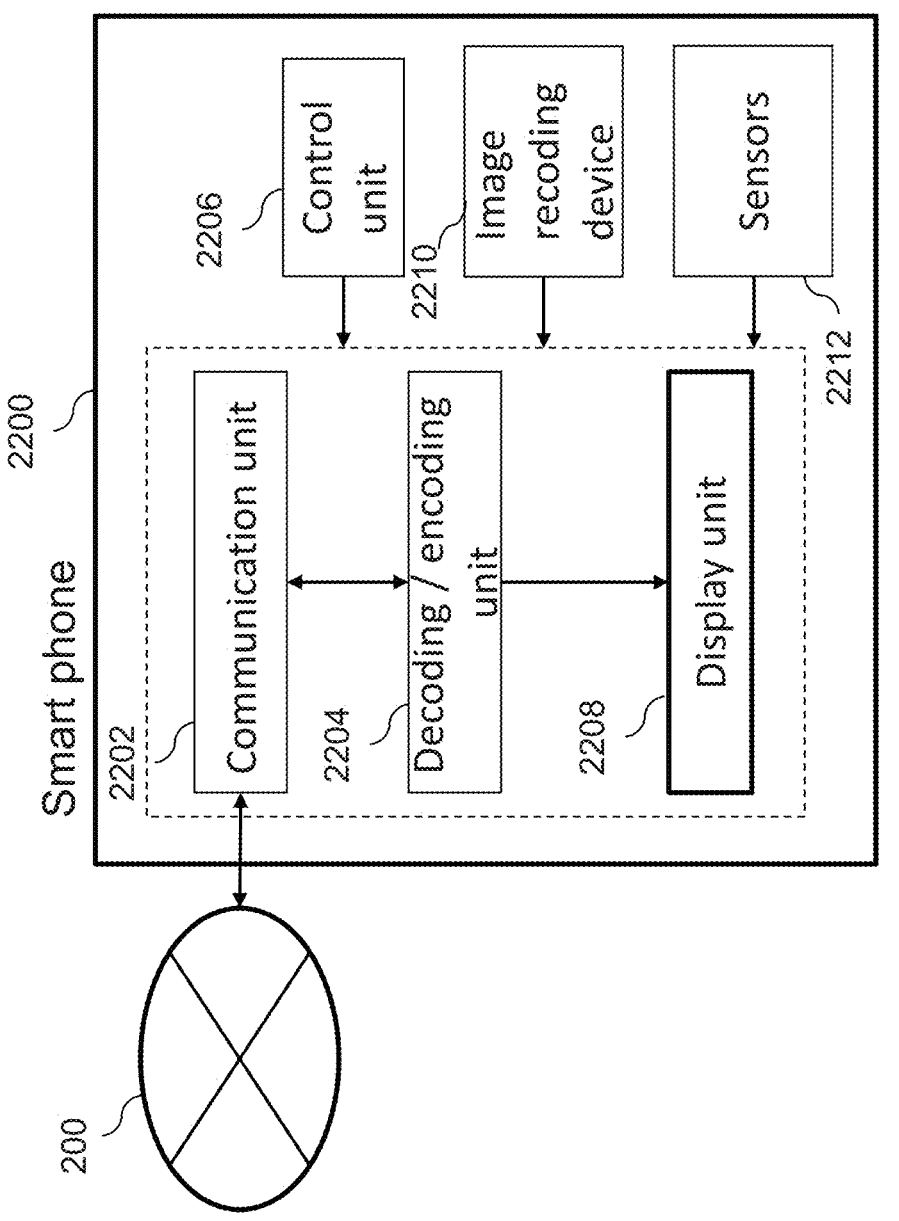

FIG. 22 is a diagram illustrating a smart phone.

DETAILED DESCRIPTION

The present invention relates to improved signalling of an affine motion mode—in particular determining cases where affine mode is likely to result in an improvement in coding efficiency and ensuring that affine mode is used and/or prioritised accordingly.

Figure 1:
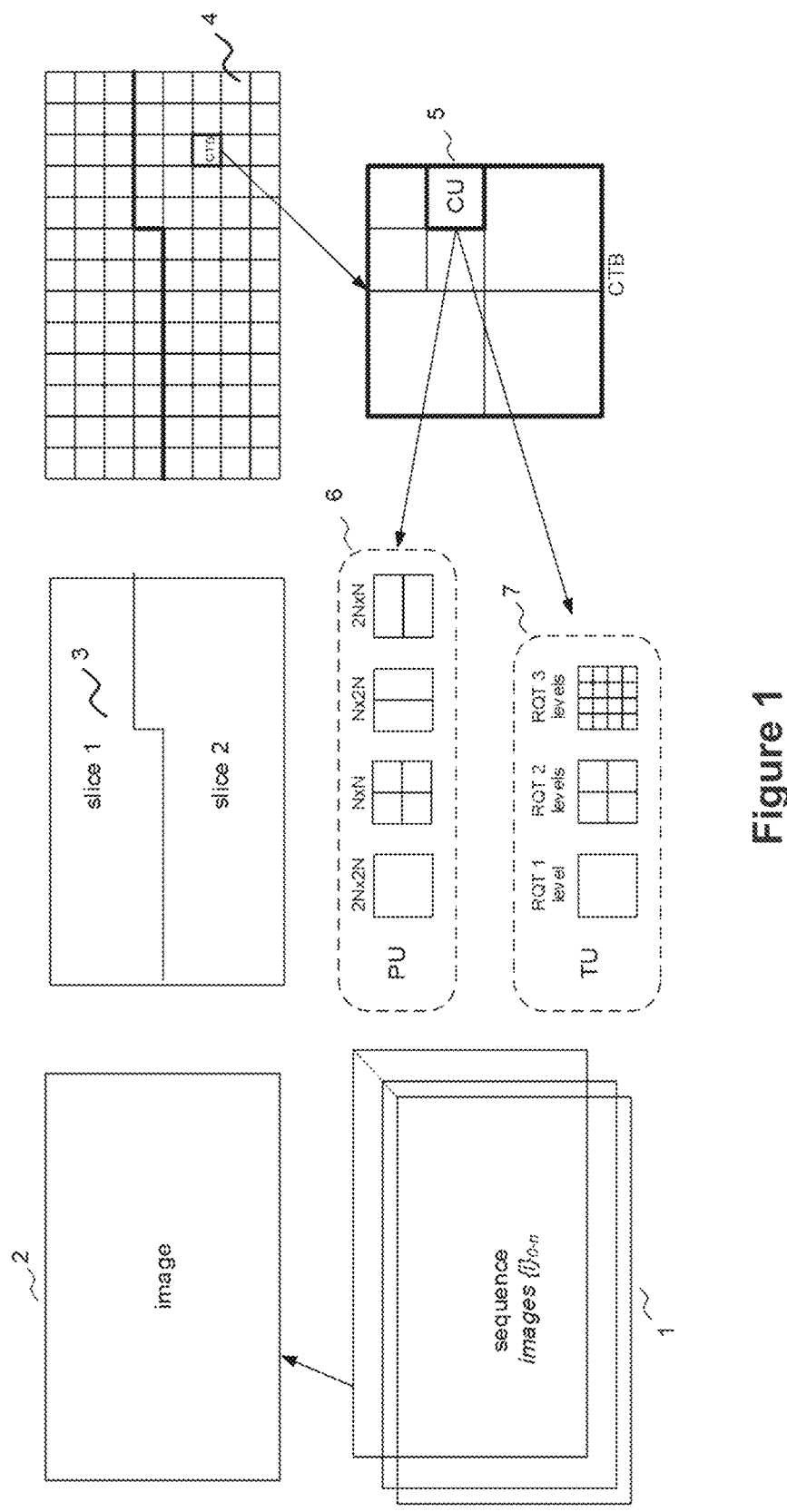
FIG. 1 is a diagram for use in explaining a coding structure used in HEVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels for HEVC, yet for VVC this size can be 128 pixels×128 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Figure 2:
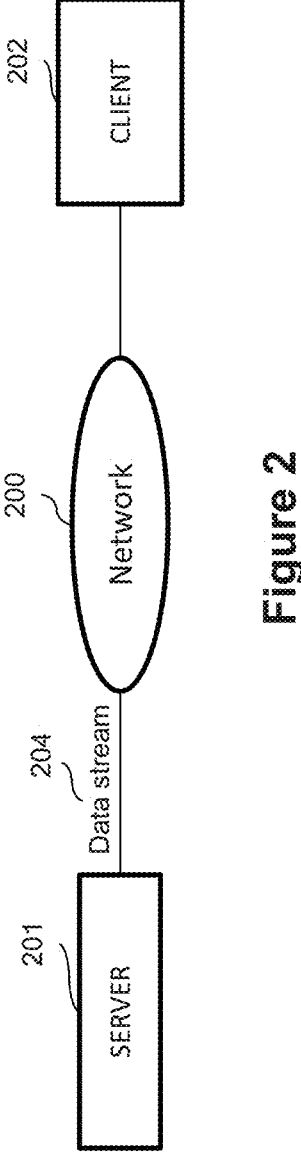
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
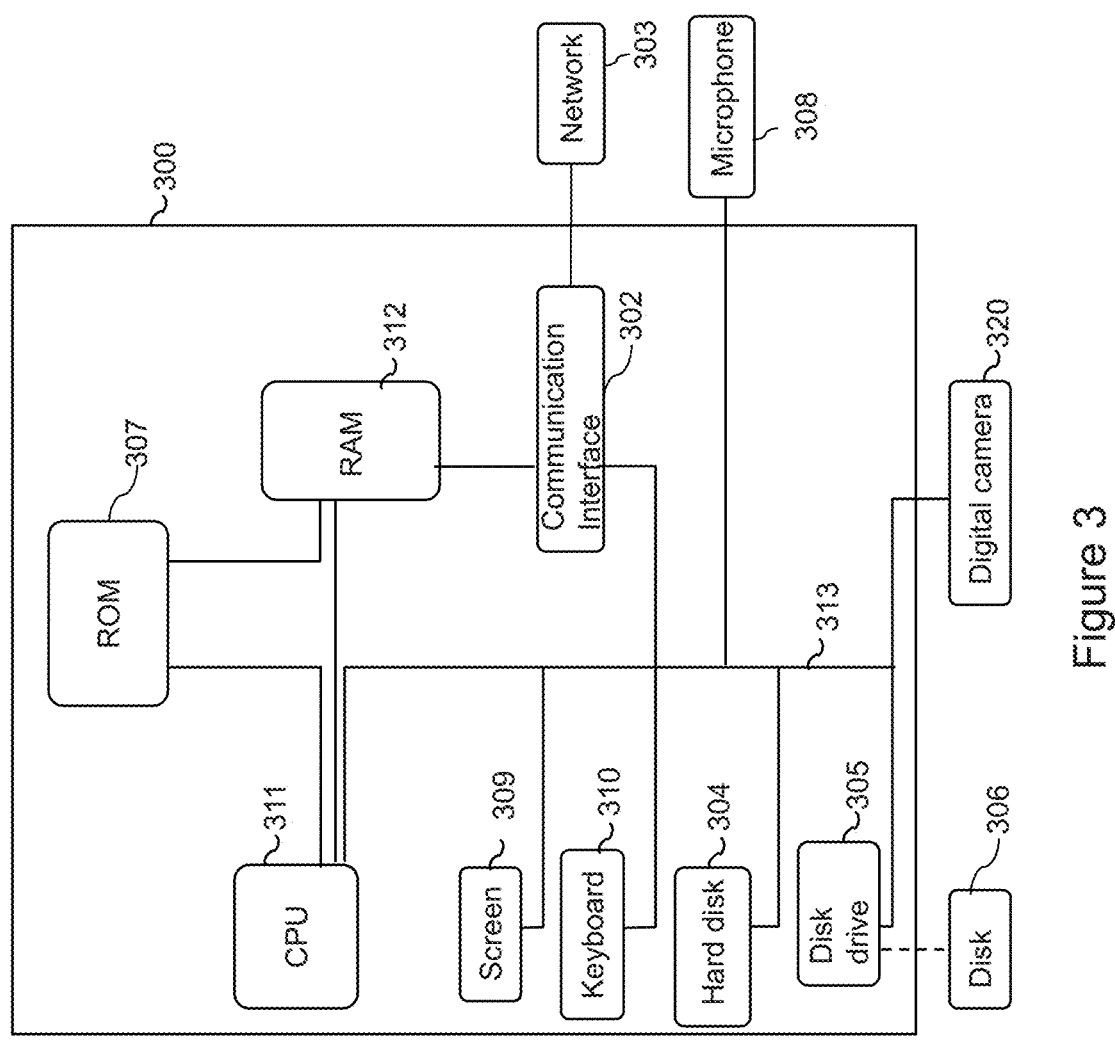
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

a central processing unit 311, such as a microprocessor, denoted CPU;

a read only memory 306, denoted ROM, for storing computer programs for implementing the invention;

a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 302 connected to a communication network 303 over which digital data to be processed are transmitted or received Optionally, the apparatus 300 may also include the following components:

a data storage means 304 such as a hard disk, for storing computer programs for implementing methods of one or more embodiments of the invention and data used or produced during the implementation of one or more embodiments of the invention;

a disk drive 305 for a disk 306, the disk drive being adapted to read data from the disk 306 or to write data onto said disk;

a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
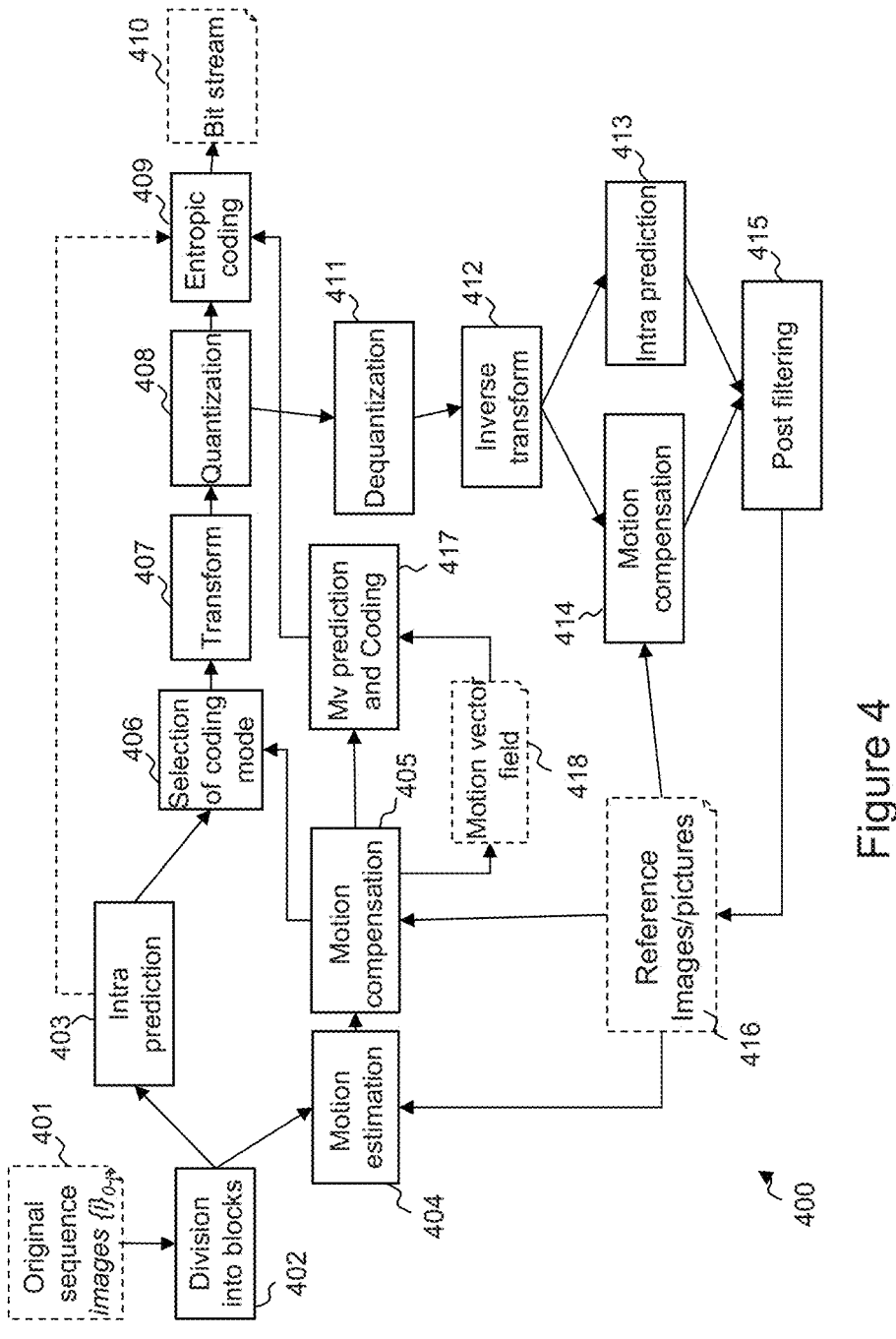
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, known as pixels.

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus, in both cases (spatial and temporal prediction), a residual is computed by subtracting the prediction from the original block.

In the INTRA prediction implemented by module 403, a prediction direction is encoded. In the temporal prediction, at least one motion vector is encoded.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416.

Figure 5:
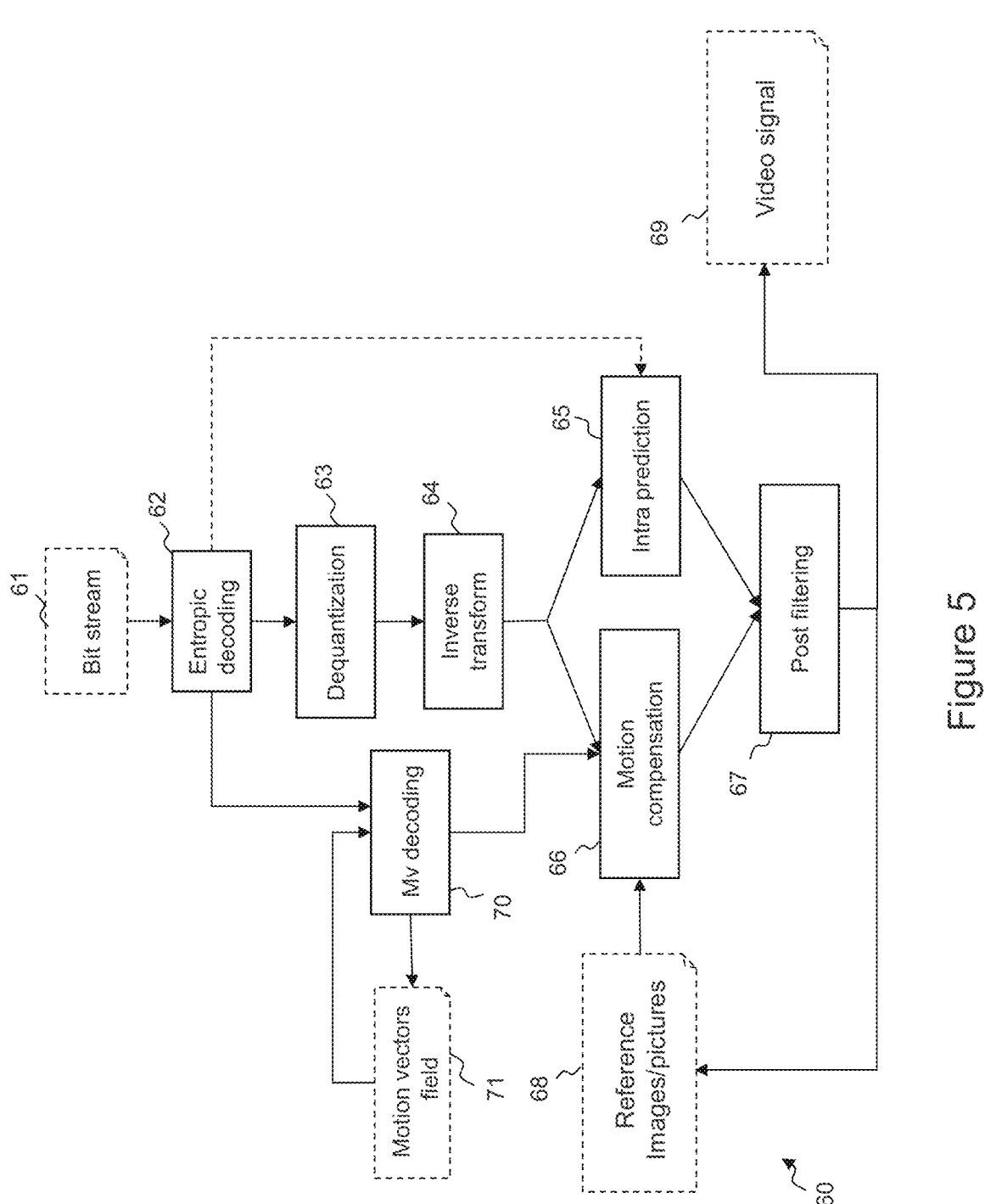
FIG. 5 is a flow chart illustrating steps of a decoding method according to embodiments of the invention.

Post filtering is then applied by module 415 to filter the reconstructed frame of pixels. In the embodiments of the invention an SAO loop filter is used in which compensation offsets are added to the pixel values of the reconstructed pixels of the reconstructed image FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoding units, each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then a reverse transform is applied by module 64 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 65 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 70.

Motion vector decoding module 70 applies motion vector decoding for each current block encoded by motion prediction. Once an index of the motion vector predictor, for the current block has been obtained the actual value of the motion vector associated with the current block can be decoded and used to apply reverse motion compensation by module 66. The reference image portion indicated by the decoded motion vector is extracted from a reference image 68 to apply the reverse motion compensation 66. The motion vector field data 71 is updated with the decoded motion vector in order to be used for the inverse prediction of subsequent decoded motion vectors.

Finally, a decoded block is obtained. Post filtering is applied by post filtering module 67. A decoded video signal 69 is finally provided by the decoder 60.

CABAC

HEVC uses several types of entropy coding like the Context based Adaptive Binary Arithmetic Coding (CABAC), Golomb-rice Code, or simple binary representation called Fixed Length Coding. Most of the time, a binary encoding process is performed to represent the different syntax element. This binary encoding process is also very specific and depends on the different syntax elements. The arithmetic coding represents the syntax element according to their current probabilities. CABAC is an extension of the arithmetic coding which separates the probabilities of a syntax element depending on a 'context' defined by a context variable. This corresponds to a conditional probability. The context variable may be derived from the value of the current syntax of the top left block (A2 in FIG. 6b as described in more detail below) and the above left block (B3 in FIG. 6b) which are already decoded.

Inter Coding

HEVC uses 3 different INTER modes: the Inter mode, the Merge mode and the Merge Skip mode. The main difference between these modes is the data signalling in the bitstream. For the Motion vector coding, the current HEVC standard includes a competitive based scheme for Motion vector prediction which was not present in earlier versions of the standard. It means that several candidates are competing with the rate distortion criterion at encoder side in order to find the best motion vector predictor or the best motion information for respectively the Inter or the Merge mode. An index corresponding to the best predictors or the best candidate of the motion information is inserted in the bitstream. The decoder can derive the same set of predictors or candidates and uses the best one according to the decoded index. In the Screen Content Extension of HEVC, the new coding tool called Intra Block Copy is signalled as any of those three INTER modes, the difference between IBC and the equivalent INTER mode being made by checking whether the reference frame is the current one. This can be implemented e.g. by checking the reference index of the list L0, and deducing this is Intra Block Copy if this is the last frame in that list. Another way to do is comparing the Picture Order Count of current and reference frames: if equal, this is Intra Block Copy.

The design of the derivation of predictors and candidates is important in achieving the best coding efficiency without a disproportionate impact on complexity. In HEVC two motion vector derivations are used: one for Inter mode (Advanced Motion Vector Prediction (AMVP)) and one for Merge modes (Merge derivation process). The following describes these processes.

FIGS. 6a and 6b illustrates spatial and temporal blocks that can be used to generate motion vector predictors in Advanced Motion Vector Prediction (AMVP) and Merge modes of HEVC coding and decoding systems and FIG. 7 shows simplified steps of the process of the AMVP predictor set derivation.

Two predictors, i.e. the two spatial motion vectors of the AMVP mode, are chosen among the top blocks (indicated by letter 'B') and the left blocks (indicated by letter 'A') including the top corner blocks (block B2) and left corner block (block A0) and one predictor is chosen among the bottom right block (H) and centre block (Center) of the collocated block as represented in FIG. 6a.

Table 1 below outlines the nomenclature used when referring to blocks in relative terms to the current block as shown in FIGS. 6a and 6b. This nomenclature is used as shorthand but it should be appreciated other systems of labelling may be used, in particular in future versions of a standard.

TABLE 1

| Block label | Relative positional description of neighbouring block |
| --- | --- |
| A0 | 'Left corner'-diagonally down and to the left of the current block |
| A1 | 'Left' or 'Bottom left'-left of the bottom of the current block |
| A2 | 'Top left'-left of the top of the current block |
| B0 | 'Above right'-diagonally up and to the right of the current block |
| B1 | 'Above'-above the top right of the current block |
| B2 | 'Above left'-diagonally up and to the left of the current block |
| B3 | 'Up'-above the top left of the current block |
| H | Bottom right of a collocated block in a reference frame |
| Center | A block within a collocated block in a reference frame |

It should be noted that the 'current block' may be variable in size, for example 4×4, 16×16, 32×32, 64×64, 128×128 or any size in between. The dimensions of a block are preferably factors of 2 (i.e. $2^n \times 2^m$ where n and m are positive integers) as this results in a more efficient use of bits when using binary encoding. The current block need not be square, although this is often a preferable embodiment for coding complexity.

Turning to FIG. 7, a first step aims at selecting a first spatial predictor (Cand 1, 706) among the bottom left blocks A0 and A1, that spatial positions are illustrated in FIG. 6. To that end, these blocks are selected (700, 702) one after another, in the given order, and, for each selected block, following conditions are evaluated (704) in the given order, the first block for which conditions are fulfilled being set as a predictor:

the motion vector from the same reference list and the same reference image;

the motion vector from the other reference list and the same reference image;

the scaled motion vector from the same reference list and a different reference image; or the scaled motion vector from the other reference list and a different reference image.

If no value is found, the left predictor is considered as being unavailable. In this case, it indicates that the related blocks were INTRA coded or those blocks do not exist.

A following step aims at selecting a second spatial predictor (Cand 2, 716) among the above right block B0, above block B1, and left above block B2, that spatial positions are illustrated in FIG. 6. To that end, these blocks are selected (708, 710, 712) one after another, in the given order, and, for each selected block, the above mentioned conditions are evaluated (714) in the given order, the first block for which the above mentioned conditions are fulfilled being set as a predictor.

Again, if no value is found, the top predictor is considered as being unavailable. In this case, it indicates that the related blocks were INTRA coded or those blocks do not exist.

In a next step (718), the two predictors, if both are available, are compared one to the other to remove one of them if they are equal (i.e. same motion vector values, same reference list, same reference index and the same direction type). If only one spatial predictor is available, the algorithm is looking for a temporal predictor in a following step.

The temporal motion predictor (Cand 3, 726) is derived as follows: the bottom right (H, 720) position of the collocated block in a previous frame is first considered in the availability check module 722. If it does not exist or if the motion vector predictor is not available, the centre of the collocated block (Centre, 724) is selected to be checked. These temporal positions (Centre and H) are depicted in FIG. 6. In any case, scaling 723 is applied on those candidates to match the temporal distance between current frame and the first frame is the reference list.

The motion predictor value is then added to the set of predictors. Next, the number of predictors (Nb_Cand) is compared (728) to the maximum number of predictors (Max_Cand). As mentioned above, the maximum number of predictors (Max_Cand) of motion vector predictors that the derivation process of AMVP needs to generate is two in the current version of HEVC standard.

If this maximum number is reached, the final list or set of AMVP predictors (732) is built. Otherwise, a zero predictor is added (730) to the list. The zero predictor is a motion vector equal to (0, 0).

As illustrated in FIG. 7, the final list or set of AMVP predictors (732) is built from a subset of spatial motion predictors (700 to 712) and from a subset of temporal motion predictors (720, 724).

As mentioned above, a motion predictor candidate of Merge mode or of Merge Skip mode represents all the required motion information: direction, list, reference frame index, and motion vectors. An indexed list of several candidates is generated by a Merge derivation process. In the current HEVC design the maximum number of candidates for both Merge modes is equal to five (4 spatial candidates and 1 temporal candidate).

FIG. 8 is a schematic of a motion vector derivation process of the Merge modes. In a first step of the derivation process, five block positions are considered (800 to 808). These positions are the spatial positions depicted in FIG. 3 with references A1, B1, B0, A0, and B2. In a following step, the availability of the spatial motion vectors is checked and at most five motion vectors are selected (810). A predictor is considered as available if it exists and if the block is not INTRA coded. Therefore, selecting the motion vectors corresponding to the five blocks as candidates is done according to the following conditions:

if the "left" A1 motion vector (800) is available (810), i.e. if it exists and if this block is not INTRA coded, the motion vector of the "left" block is selected and used as a first candidate in list of candidate (814);

if the "above" B1 motion vector (802) is available (810), the candidate "above" block motion vector is compared to "left" A1 motion vector (812), if it exists. If B1 motion vector is equal to A1 motion vector, B1 is not added to the list of spatial candidates (814). On the contrary, if B1 motion vector is not equal to A1 motion vector, B1 is added to the list of spatial candidates (814);

if the "above right" B0 motion vector (804) is available (810), the motion vector of the "above right" is compared to B1 motion vector (812). If B0 motion vector is equal to B1 motion vector, B0 motion vector is not added to the list of spatial candidates (814). On the contrary, if B0 motion vector is not equal to B1 motion vector, B0 motion vector is added to the list of spatial candidates (814);

if the "below left" A0 motion vector (806) is available (810), the motion vector of the "below left" is compared to A1 motion vector (812). If A0 motion vector is equal to A1 motion vector, A0 motion vector is not added to the list of spatial candidates (814). On the contrary, if A0 motion vector is not equal to A1 motion vector, A0 motion vector is added to the list of spatial candidates (814); and if the list of spatial candidates doesn't contain four candidates, the availability of "above left" B2 motion vector (808) is checked (810). If it is available, it is compared to A1 motion vector and to B1 motion vector. If B2 motion vector is equal to A1 motion vector or to B1 motion vector, B2 motion vector is not added to the list of spatial candidates (814). On the contrary, if B2 motion vector is not equal to A1 motion vector or to B1 motion vector, B2 motion vector is added to the list of spatial candidates (814).

At the end of this stage, the list of spatial candidates comprises up to four candidates.

For the temporal candidate, two positions can be used: the bottom right position of the collocated block (816, denoted H in FIG. 6) and the centre of the collocated block (818). These positions are depicted in FIG. 6.

As for the AMVP motion vector derivation process, a first step aims at checking (820) the availability of the block at the H position. Next, if it is not available, the availability of the block at the centre position is checked (820). If at least one motion vector of these positions is available, the temporal motion vector can be scaled (822), if needed, to the reference frame having index 0, for both list L0 and L, in order to create a temporal candidate (824) which is added to the list of Merge motion vector predictor candidates. It is positioned after the spatial candidates in the list. The lists L0 and L1 are 2 reference frame lists containing zero, one or more reference frames.

If the number (Nb_Cand) of candidates is strictly less (826) than the maximum number of candidates (Max_Cand that value is signalled in the bit-stream slice header and is equal to five in the current HEVC design) and if the current frame is of the B type, combined candidates are generated (828). Combined candidates are generated based on available candidates of the list of Merge motion vector predictor candidates. It mainly consists in combining the motion vector of one candidate of the list L0 with the motion vector of one candidate of list L1.

If the number (Nb_Cand) of candidates remains strictly less (830) than the maximum number of candidates (Max_Cand), zero motion candidates are generated (832) until the number of candidates of the list of Merge motion vector predictor candidates reaches the maximum number of candidates.

At the end of this process, the list or set of Merge motion vector predictor candidates is built (834). As illustrated in FIG. 8, the list or set of Merge motion vector predictor candidates is built (834) from a subset of spatial candidates (800 to 808) and from a subset of temporal candidates (816, 818).

Alternative Temporal Motion Vector Prediction (ATMVP)

The alternative temporal motion vector prediction (ATMVP) is a particular motion compensation. Instead of considering only one motion information for the current block from a temporal reference frame, each motion information of each collocated block is considered. So this temporal motion vector prediction gives a segmentation of the current block with the related motion information of each sub-block as depicted in FIG. 9.

In the current VTM reference software, ATMVP is signalled as a merge candidate inserted in the list of Merge candidates. When ATMVP is enabled at SPS level, the maximum number of Merge candidates is increased by one. So 6 candidates are considered instead of 5 when this mode is disabled.

In addition when this prediction is enabled at SPS level, all bins of merge index are context coded by CABAC. While in HEVC or when ATMVP is not enabled at SPS level, only the first bin is context coded and the remaining bins are context by-pass coded. FIG. 10(a) illustrates the coding of the Merge index for HEVC, or when ATMVP is not enabled at SPS level. This corresponds to a unary max coding. In addition the first bit is CABAC coded and the other bits are bypass CABAC coded.

FIG. 10(b) illustrates the coding of the Merge index when ATMVP is enabled at SPS level. In addition all bits are CABAC coded (from the $1^{st}$ to the $5^{th}$ bit). It should be noted that each index has its own context—in other words their probabilities are separated.

Affine Mode

In HEVC, only translation motion model is applied for motion compensation prediction (MCP). While in the real world, there are many kinds of motion, e.g. zoom in/out, rotation, perspective motions and other irregular motions.

In the JEM, a simplified affine transform motion compensation prediction is applied and the general principle of Affine mode is described below based on an extract of document JVET-G1001 presented at a JVET meeting in Torino at 13-21 Jul. 2017. This entire document is hereby incorporated by reference insofar as it describes other algorithms used in JEM.

As shown in FIG. 11(a), the affine motion field of the block is described by two control point motion vectors.

The motion vector field (MVF) of a block is described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \tag{1}$$

Where ($v_{0x}$, $v_{0y}$) is motion vector of the top-left corner control point, and ($v_{1x}$, $v_{1y}$) is motion vector of the top-right corner control point.

In order to further simplify the motion compensation prediction, sub-block based affine transform prediction is applied. The sub-block size M×N is derived as in Equation 2, where MvPre is the motion vector fraction accuracy ($\frac{1}{16}$ in JEM), ($v_{2x}$, $v_{2y}$) is motion vector of the bottom-left control point, calculated according to Equation 1.

$$\begin{cases} M = \mathrm{clip3}\left(4, \ w, \ \dfrac{w \times MvPre}{\max(\mathrm{abs}(v_{1x} - v_{0x}), \ \mathrm{abs}(v_{1y} - v_{0y}))}\right) \\ M = \mathrm{clip3}\left(4, \ h, \ \dfrac{h \times MvPre}{\max(\mathrm{abs}(v_{2x} - v_{0x}), \ \mathrm{abs}(v_{2y} - v_{0y}))}\right) \end{cases} \quad (2)$$

After derived by Equation 2, M and N may be adjusted downward if necessary to make it a divisor of w and h, respectively.

To derive motion vector of each M×N sub-block, the motion vector of the center sample of each sub-block, as shown in FIG. 6a, is calculated according to Equation 1, and rounded to $\frac{1}{16}$ fraction accuracy. Then motion compensation interpolation filters are applied to generate the prediction of each sub-block with derived motion vector.

The affine mode is a motion compensation mode as inter modes (AMVP, Merge, Merge Skip). Its principle is to generate one motion information per pixel according to 2 or 3 neighbouring motion information. In the current VTM reference software, the affine mode derives one motion information for each 4×4 block as depicted in FIG. 11(a). This mode is available for AMVP and both Merge modes are enabled thanks to a flag. This flag is CABAC coded. In an embodiment, the context depends on the sum of affine flags of the left block (position A2 of FIG. 6b) and the above left block (position B3 of FIG. 6b).

So three context variables (0, 1 or 2) are possible in the JEM for the affine flag given by the following formula:

$$Ctx = IsAffine(A2) + IsAffine(B3)$$

Where IsAffine (block) is a function which returns 0 if the block is not an affine block and 1 if the block is affine.

Affine Merge Candidate Derivation

In the JEM, the affine Merge mode (Merge or Merge Skip) is derived from the first neighbouring block which is affine among blocks at positions A1, B1, B0, A0, B2. These positions are depicted in FIGS. 6a and 6b. However, how the affine parameter is derived is not completely defined, and the present invention aims to improve at least this aspect.

Affine Merge Signalling

FIG. 12 is a flow chart of the partial decoding process of some syntax elements related to the coding mode. In this figure the Skip flag (1201), the prediction mode (1211), the Merge flag (1203) the Merge Index (1208) and the affine flag (1207) can be decoded.

For all CU in an Inter slice, the Skip flag is decoded (1201). If the CU is not Skip (1202), the pred mode (Prediction mode) is decoded (1211). This syntax element indicates if the current CU is an Inter or an Intra mode. Please note that if the CU is Skip (1202), its current mode is the Inter mode. If the CU (1212), the CU is coded in AMVP or in Merge mode. If the CU is Inter (1212), the Merge flag is decoded (1203). If the CU is Merge (1204) or if the CU is Skip (1202), it is verified (1205) if the affine flag (1206) needs to be decoded. This flag is decoded if the current CU is a 2N×2N CU, which means in the current VVC that the height and the width of the CU shall be equal. Moreover, at least one neighbouring CU A1 or B1 or B0 or A0 or B2 must be coded with the affine mode (Merge or AMVP). Eventually the current CU shall not be a 4×4 CU but by default the CU 4×4 are disabled in the VTM reference software. If this condition (1205) is false, it is sure that the current CU is coded with the classical Merge mode or Merge Skip mode and a Merge Index is decoded (1208). If the Affine Flag (1206) is set equal to 1 (1207), the CU is a Merge affine CU or a Merge Skip Affine CU and the Merge index (1208) doesn't need to be decoded. Otherwise, the current CU is a classical (basic) Merge or Merge Skip CU and the Merge index candidate (1208) is decoded.

In this specification 'signalling' may refer to inserting into, or extracting from, the bitstream one or more syntax element representing the enabling or disabling of a mode other information.

Merge Candidates Derivation

FIG. 13 is a flow chart illustrating the Merge candidates derivation. This derivation has been built on top of the Merge List derivation of HEVC represented in FIG. 8. The main changes compared to HEVC are the addition of the ATMVP candidate (1319, 1321, 1323), the full duplicate checks of candidates (1320, 1325) and a new order of the candidates. The ATMVP prediction is set as a special candidate as it represents several motion information of the current CU. The value of the first sub-block (top left) is compared to the temporal candidate and the temporal candidate is not added in the list of Merge if they are equal (1320). The ATMVP candidate is not compared to other spatial candidates. In opposite to the temporal candidate which is compared to each spatial candidate already in the list (1325) and not added in the Merge candidate list if it is a duplicate candidate.

When a spatial candidate is added in the list it is compared to the other spatial candidates in the list (1310) which is not the case in the final version of HEVC.

In the current VTM version the list of merge candidates is set as the following order as it has been determined to provide the best results over the coding test conditions:

A1
B1
B0
A0
ATMVP
B2
TEMPORAL
Combined
Zero_MV

It is important to note that spatial candidate B2 is set after the ATMVP candidate.

In addition, when ATMVP is enabled at slice level the maximum number in the list of candidates is 6 instead of 5.

It is an object of the present invention to signal affine mode in a portion of a bitstream in an efficient manner taking into account coding efficiency and complexity. It is also an object of the present invention to signal affine mode in a way which requires a minimum amount of structural modification to the existing video coding framework.

Exemplary embodiments of the invention will now be described with reference to FIGS. 13-21. It should be noted that the embodiments may be combined unless explicitly stated otherwise; for example certain combinations of embodiments may improve coding efficiency at increased complexity, but this may be acceptable in certain use cases.

In overview, by modifying the syntax of signalling motion predictor modes so as to utilise affine mode when it is more likely to provide improved motion compensation it is possible to improve coding efficiency at an acceptable increase of coding complexity.

First Embodiment

In a first embodiment, affine motion prediction mode may be signalled (e.g. enabled or disabled) for a portion of a bitstream for at least one Inter mode. The inter prediction mode used for the portion of said bitstream is determined and affine motion mode is signalled (enabled or disabled) in dependence on the Inter prediction mode used in that portion of the bitstream.

An advantage of this embodiment is a better coding efficiency by removing unused syntax. In addition, it reduces the encoder complexity by avoiding some Inter coding possibilities which don't need to be evaluated. Eventually, at decoder side some affine flags which are CABAC coded don't need to be extracted from the bitstream which increases the efficiency of the decoding process.

An example of the First embodiment, the Skip mode is not enabled for the affine mode. It means that when the CU is a skipped CU (on the basis of the status or presence of a skip flag in the datastream) the affine flag doesn't need to be extracted from the bitstream. FIG. 14 (which shares the same structure as FIG. 12 and the corresponding description applies here) illustrates this example. In FIG. 14, when the CU is Skip (1402), the affine flag (1406) is not decoded and the conditions in 1405 are not evaluated. If, the CU is Skip the merge index is decoded (1406).

An advantage of this example is a coding efficiency improvement for sequences with a small amount of motion, and no reduction in coding efficiency for sequences with more motion. This is because as Skip mode is typically used when there is little or no motion, and as such it would be unlikely that affine mode would be appropriate. As explained above, the complexity of the encoding and decoding processes are also reduced.

In an additional example, the affine Merge Skip mode can be enabled or disabled at a high level—for example at the slice, frame, sequence or CTU level. This may be determined on the basis of a high level syntax flag. In such a case, the affine Merge Skip can be disabled for sequence or for frame with small amount of motion and enabled when the motion quantity is increased. An advantage of this additional example is a flexibility on the usage of the affine Merge Skip.

In one embodiment, the affine Merge Skip mode is never evaluated at encoder side consequently, no bitstream contains an affine Merge Skip mode. The advantage is that a coding efficiency can be observed but smaller than for the first embodiment.

Merge and Skip mode may not be enabled for Affine (or Affine is enabled only for AMVP). In a further example, the Merge and Merge Skip modes are not enabled for the affine mode. It means that when the CU is a skipped or Merge, the affine flag doesn't need to be extracted from the bitstream. Compared to FIG. 14, in this embodiment, the module 1405, 1406 and 1407 are removed.

The advantage of this example is similar to the example immediately above. An advantage is a coding efficiency improvement for sequences with small amounts of motion and the same coding efficiency for sequences with more motion. As explained above, the complexity of the encoding and decoding processes are reduced.

A High level syntax element signals that Affine Merge can be enabled. In a yet further example, the affine Merge mode and Merge Skip mode can be enabled or disabled at high level as the Slice, frame, sequence or CTU level with one flag. In that case, the affine Merge can be disabled for sequence or for frame with small amounts of motion and enabled when the motion quantity is increased. An advantage of this additional embodiment is a flexibility on the usage of the affine Skip.

In an alternative example, one flag is signalled for Merge Skip mode and one flag for Merge mode.

In another example, the affine Merge Skip mode and the Merge mode are never evaluated at encoder side. Consequently, no bitstream contains an Affine Merge Skip mode. An advantage is that a coding efficiency can be observed.

Second Embodiment

In a second embodiment, signalling the affine mode for a current block is in dependence on a mode of one or more neighbouring blocks. There is likely to be a correlation in how neighbouring blocks are encoded which can be exploited to improve coding efficiency. In particular, if one or more of certain neighbouring blocks use affine mode it is more likely that affine mode would be appropriate for the current mode.

In one embodiment, the number of candidates for the affine Merge or affine Merge Skip mode is reduced to only 2 candidates. The advantage of this embodiment is a complexity reduction at decoder side because fewer affine flags are decoded for Merge mode and less comparisons and memory buffer access are needed for affine merge checking condition (1205). At encoder side fewer affine Merge modes need to be evaluated.

In one example of the second embodiment, one neighbouring block to the left and one neighbouring block above the current block (for example candidates A1 and B1 as depicted in FIG. 6) are evaluated to know if the affine flag needs to be decoded and for the derivation of the affine merge candidate. The advantage of taking only these 2 positions for the affine merge is a similar coding efficiency as keeping 5 candidates as the current VTM implementation with a complexity reduction. FIG. 15 illustrates this embodiment. In this figure compared to FIG. 12 the module 1505 has been changed by a checking of only A1 and B1 positions.

In a further example of the second embodiment, only candidates A2 and B3 as depicted in FIG. 6b are evaluated to determine whether or not the affine flag needs to be decoded and for the derivation of the affine merge candidate. The advantages of this example are the same as the previous example but it also reduces the memory access in the 'worst case' compared to the previous example. Indeed with positions A2 and B3, the positions are the same as those used for the affine flag context derivation. Indeed for the affine flag, the context derivation depends on the neighbouring block at positions A2 and B3 of FIG. 6b. Consequently if the Affine flag needs to be decoded, the affine flag values of A2 and B3 are already in the memory for the context derivation of the current affine flag and as such further memory access is not necessary.

Third Embodiment

In a third embodiment signalling the affine mode for a current block is in dependence of a list of merge candidates corresponding to blocks neighbouring a current block.

In an example of the third embodiment, the list starts with the blocks which have been used to determine a context variable relating to said block as the affine flag values for such blocks are already in the memory for the context derivation of the current affine flag and as such further memory access is not necessary. For example, the possible affine merge candidates are A2 or B3 or B0 or A0 or B2 is this order (instead of A1 or B1 or B0 or A0 or B2) as depicted in FIG. 6(b). This gives a coding efficiency improvement compared to the current VTM. And it also limits the amount of affine flags which need to be accessed for the decoding of the affine flag for the worst case scenario. With the current version, 5 for module 1205 and 2 for Affine flag context derivation and with the present embodiment, only 5 as the affine flag values of A2 and B3 are already in the memory for the context derivation of the current affine flag and as such further memory access is not necessary.

A variation on the Third Embodiment relates to context alignment. Signalling an affine mode may comprise inserting a context encoded flag into the data stream, wherein the context variable for said flag is determined based on whether or not neighbouring blocks use affine mode.

In an alternative example of the third embodiment, the positions considered for the context derivation of the affine flag are the positions A1 and B1 instead of positions A2 and B3 as depicted in FIG. 6b. In that case, the same advantages of the previous example are obtained. This is the other alignment between context and affine merge derivation. In that case the context variable for the affine flag is obtained according to the following formula:

$$Ctx = IsAffine(A1) + IsAffine(B1)$$

where Ctx is the context for the affine flag and IsAffine is a function which returns 0 if the block is not an affine block and 1 if the block is affine. In this example, the affine flag values of A1 and B1 are stored in the memory for the context derivation of the current affine flag and as such further memory access is not necessary In a further alternative example, the positions considered for the context derivation of the affine flag are the positions A1 and B1 instead of positions A2 and B3 when the current block is a Merge mode (both Merge modes). The additional advantage compared to the previous example is better coding efficiency. Indeed, for AMVP there is no need for the context derivation to be aligned to the derivation of motion vector because for AMVP the affine blocks are not considered for this derivation.

Fourth Embodiment

In a fourth embodiment, signalling the affine mode is performed in dependence on whether or not neighbouring blocks are Merge mode or not.

In one example of the fourth embodiment, a candidate for the affine Merge (Merge and Skip) can be only an affine AMVP candidate. FIG. 17 illustrates this embodiment. The advantage of this embodiment is a coding complexity reduction because fewer affine flags need to be decoded without impacting on coding efficiency.

In a further example of the fourth embodiment, a candidate for the affine Merge (Merge and Skip) can be only an affine AMVP candidate or a Merge affine candidate but not an affine Merge Skip.

As with the previous example, the advantage of this example is a coding complexity reduction because fewer affine flags need to be decoded without impact on coding efficiency.

Fifth Embodiment

In a fifth embodiment signalling the affine mode comprises inserting affine mode as a candidate motion predictor.

In one example of the fifth embodiment, the Affine Merge (and Merge Skip) is signalled as a Merge candidate. In that case the modules 1205, 1206 and 1207 of FIG. 12 are removed. In addition, not to affect the coding efficiency of the Merge mode, the maximum possible number of merge candidates is incremented. For example, in the current VTM version this value is set equal to 6, so with if applying this embodiment to the current version of VTM, the value would be 7.

The advantage is a design simplification of the syntax element of Merge mode because fewer syntax elements need to be decoded. In some circumstances, a coding efficiency can be observed.

Two possibilities to implement this example will now be described:

The Affine Merge index always has the same position inside the list whatever the value of the other Merge MV. The position of a candidate motion predictor indicates its likelihood of being selected and as such if it placed higher up the list (a lower index value), that motion vector predictor is more likely to be selected.

In the first example, the affine Merge index always has the same position inside the list of Merge candidates. This means that it has a fixed Merge idx value. For example this value can be set equal to 5, as the affine merge mode should represent complex motion which is not the most probable content. The additional advantage of this embodiment is that when the current block is parsed (decoding/reading of the syntax element only but not decoding the data itself), the current block can be set as affine block. Consequently the value can be used to determine the CABAC context for the affine flag which is used for AMVP. So the conditional probabilities should be improved for this affine flag and the coding efficiency should be better.

In a second example, the affine Merge candidate is derived with other Merge candidates. In this example, a new affine Merge candidate is added into the list of Merge candidates. FIG. 18 illustrates this example. Compared to FIG. 13, the Affine candidate is the first affine neighbouring block A1, B1, B0, A0 B2 (1917). If the same condition as 1205 of FIG. 12 is valid (1927), the motion vector field produced with the affine parameters is generated to obtain the affine candidate (1929). The list of initial candidates can have 4, 5, 6 or 7 candidates according to the usage of ATMVP, Temporal and Affine candidates.

The order between all these candidate is important as more likely candidates should be processed first to ensure they are more likely to make the cut of motion vector candidates—a preferred ordering is the following:

A1
B1
B0
A0
AFFINE MERGE
ATMVP
B2
TEMPORAL
Combined
Zero_MV

It is important to note that the Affine Merge is before the ATMVP mode but after the four main neighbouring blocks.

An advantage to set the affine Merge before the ATMVP candidate is a coding efficiency increase, as compared to setting it after the ATMVP and the temporal predictor. This coding efficiency increase depends on the GOP (group of pictures) structure and Quantization Parameter (QP) setting of each picture in the GOP. But for the most use GOP and QP setting this order give a coding efficiency increase.

A further advantage of this solution is a clean design of the Merge and Merge Skip for both syntax and derivation. Moreover, the affine candidate merge index can change according to the availability or value (duplicate check) of previous candidates in the list. Consequently an efficient signalization can be obtained.

In a further example, the affine Merge index is variable according to one or several conditions.

For example, the Merge index or the position inside the list associated to the affine candidate changes according to a criterion. The principle is to set a low value for merge index corresponding to the affine merge when the affine merge has a high probability to be selected (and a higher value when there is low probability to be selected).

An advantage of this example is a coding efficiency increase thanks to an optimal adaptation of the merge index when it is most likely to be used.

The criteria for selecting the position of the affine mode in the list of merge candidates include:

a) if the Skip Mode is Enabled (the Status of a Skip Flag)

In one example of applying this criterion, the affine Merge index has a value set equal to a high value (5 for example) or it is set after the spatial and temporal MV if the current Merge is the Merge Skip mode.

As explained for the first embodiment, there is low chance that the affine mode would be selected for Skip mode as there is unlikely to be any significant (or complex) motion.

b) Motion Information of Neighbouring Blocks

In one example of applying this criterion, the affine Merge index has a value set equal to a high value or it is set after the spatial and temporal MV if the motion information of one block to the left and one block above (for example, blocks A1 and B1) are similar, or equal.

When A1 has the same motion information as B1, there is a high probability that the motion information is constant for the current block. So the affine merge has a low probability to be selected.

c) An ATMVP Candidate

In one example of applying this criterion, the affine Merge index has a value set equal to a high value or it is set after the spatial and temporal MV if the ATMVP candidate contains only one motion information. In that case, there is no subdivision in the previous frame of the collocated block.

So there is small chance that the current block content is inside a non-constant motion, so it is preferable not to set the affine at a higher position inside the merge list.

d) If the neighbouring block use affine mode

In one example of applying this criterion, the affine Merge index has a value set equal to a low value or it is set before the temporal prediction and far from the spatial predictor if more than one neighbouring block is an affine.

In an additional example of applying this criterion, the Affine Merge index or the affine position (idx) is set equal to idx=P−N where P is the lowest position possible for the affine merge index and N is a number of affine neigbouring blocks. In one example P is 5 and N is 5 and the neighbouring blocks are A1, B1, B0, A0, B2. It should be noted that in this notation the highest position has an index value of zero.

With this example, the Affine merge index of merge candidate position, is set according to a probability related to its neighbouring block. So at the first position when all neighbouring positions are affine and at the $4^{th}$ position when only one neighbouring block is affine.

It should be appreciated that the example value '5' can be set to 6 or 7 to obtain a similar coding efficiency.

It should also be appreciated that a combination of these criteria would be possible.

In another example of the fifth embodiment, the affine mode is signalled in dependence on said determining the likelihood of affine mode for said current block. In a particular example, affine Merge candidate is not added inside the list of candidates or no index corresponds to the affine merge according to a criteria. The principle of this example is to disable the affine mode where it is not likely to be useful.

The advantage of this example is a coding efficiency increase thanks to an optimal usage of the merge index bits.

The criteria for determining the likelihood of affine mode being useful include:

a) The Status of a Skip Flag

In one example of applying this criterion, the affine Merge candidate is not added when the current Merge is a Merge Skip mode. As explained for the first embodiment, there is a low chance that the affine mode is selected for Skip mode.

b) Motion Information of Neighbouring Blocks

In one embodiment of applying this criterion, the affine Merge candidate is not added if the motion information of one block to the left and one block above (for example, blocks A1 and B1) are similar, or equal.

When one block to the left and one block above (for example, blocks A1 and B1) have the same motion information, there is a high probability that the motion information is constant for the current block. So the affine merge should be disabled.

c) An ATMVP Candidate

In one embodiment of applying this criterion, the affine Merge candidate is not added if the ATMVP candidate contains only one motion information.

In such an example, there is small chance that the current block content is inside a non-constant motion, so it is preferable to disable the affine at a higher position inside the merge list.

It should be appreciated that a combination of these criteria would be possible.

Implementation of Embodiments of the Invention

FIG. 20 is a schematic block diagram of a computing device 1300 for implementation of one or more embodiments of the invention. The computing device 1300 may be a device such as a micro-computer, a workstation or a light portable device. The computing device 1300 comprises a communication bus connected to: —a central processing unit (CPU) 1301, such as a microprocessor; —a random access memory (RAM) 1302 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 1303 for storing computer programs for implementing embodiments of the invention; —a network interface (NET) 1304 is typically connected to a communication network over which digital data to be processed are transmitted or received. The network interface (NET) 1304 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1301; —a user interface (UI) 1305 may be used for receiving inputs from a user or to display information to a user; —a hard disk (HD) 1306 may be provided as a mass storage device; —an Input/Output module (IO) 1307 may be used for receiving/ sending data from/to external devices such as a video source or display. The executable code may be stored either in the ROM 1303, on the HD 1306 or on a removable digital medium such as, for example a disk. According to a variant, the executable code of the programs can be received by means of a communication network, via the NET 1304, in order to be stored in one of the storage means of the communication device 1300, such as the HD 1306, before being executed. The CPU 1301 is adapted to control and direct the execution of the instructions or portions of software code of the program or programs according to embodiments of the invention, which instructions are stored in one of the aforementioned storage means. After powering on, the CPU 1301 is capable of executing instructions from main RAM memory 1302 relating to a software application after those instructions have been loaded from the program ROM 1303 or the HD 1306, for example. Such a software application, when executed by the CPU 1301, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 21 and 22.

FIG. 21 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully.

The encoding unit 2108 encodes the image data by using said encoding methods explained in first to fifth embodiments. The encoding unit 2108 uses at least one of encoding methods explained in first to fifth embodiments. For another instance, the encoding unit 2108 can use combination of encoding methods explained in first to fifth embodiments.

The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2118 of the client apparatus 2104 transmits the commands to the network camera 2102.

Further, the communication unit 2118 of the client apparatus 2104 receives the encoded image data from the network camera 2102.

The decoding unit 2116 decodes the encoded image data by using said decoding methods explained in any of the first to fifth embodiments. For another instance, the decoding unit 2116 can use combination of decoding methods explained in the first to fifth embodiments.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 includes the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2118 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

The network camera system 2100 may determine if the camera 2102 utilizes zoom or pan during the recording of video, and such information may be used when encoding a video stream as zooming or panning during filming may benefit from the use of affine mode which is well-suited to coding complex motion such as zooming, rotating and/or stretching (which may be side-effects of panning, in particular if the lens is a 'fish eye' lens).

FIG. 22 is a diagram illustrating a smart phone 2200.

The smart phone 2200 includes a communication unit 2202, a decoding/encoding unit 2204, a control unit 2206 and a display unit 2208.

the communication unit 2202 receives the encoded image data via network.

The decoding unit 2204 decodes the encoded image data received by the communication unit 2202.

The decoding unit 2204 decodes the encoded image data by using said decoding methods explained in first to fifth embodiments. The decoding unit 2204 can use at least one of decoding methods explained in first to fifth embodiments. For another instance, the encoding unit 2202 can use combination of decoding methods explained in first to fifth embodiments.

The control unit 2206 controls other units in the smart phone 2200 in accordance with a user operation or commands received by the communication unit 2202.

For example, the control unit 2206 controls a display apparatus 2208 so as to display an image decoded by the decoding unit 2204.

The smart phone may further comprise an image recording device 2210 (for example a digital camera an associated circuity) to record images or videos. Such recorded images or videos may be encoded by the decoding/encoding unit 2204 under instruction of the control unit 2206.

The smart phone may further comprise sensors 2212 adapted to sense the orientation of the mobile device. Such sensors could include an accelerometer, gyroscope, compass, global positioning (GPS) unit or similar positional sensors. Such sensors 2212 can determine if the smart phone changes orientation and such information may be used when encoding a video stream as a change in orientation during filming may benefit from the use of affine mode which is well-suited to coding complex motion such as rotations.

Alternatives and Modifications

It will be appreciated that an object of the present invention is to ensure that affine mode is utilised in a most efficient manner, and certain examples discussed above relate to signalling the use of affine mode in dependence on a perceived likelihood of affine mode being useful. A further example of this may apply to encoders when it is known that complex motion (where an affine transform may be particularly efficient) is being encoded. Examples of such cases include:

a) A camera zooming in/out b) A portable camera (e.g. a mobile phone) changing orientation during filming (i.e. a rotational movement)

c) A 'fisheye' lens camera panning (e.g. a stretching/distortion of a portion of the image As such, an indication of complex motion may be raised during the recording process so that affine mode may be given a higher likelihood of being used for the slice, sequence of frames or indeed the entire video stream.

In a further example, affine mode may be given a higher likelihood of being used depending on a feature or functionality of the device used to record the video. For example, a mobile device may be more likely to change orientation than (say) a fixed security camera so affine mode may be more appropriate for encoding video from the former. Examples of features or functionality include: the presence/use of zooming means, the presence/use of a positional sensor, the presence/use of panning means, whether or not the device is portable, or a user-selection on the device.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding an image from a bitstream encoded using motion prediction, the method comprising:

decoding a flag being capable of indicating that a current block is not skipped;

decoding prediction mode information used to determine whether a prediction mode for the current block is an intra mode or an inter mode, when the flag indicates that the current block is not skipped;

determining, from a plurality of prediction modes including the intra mode and the inter mode, the prediction mode used to decode the current block of the image, based on the prediction mode information;

compiling a list of candidate motion predictors in the case where the inter mode is determined for the current block; and placing a candidate for subblock affine prediction as a merge candidate lower in said list than a temporal motion vector candidate, the subblock affine prediction deriving at least one motion vector per subblock in the current block by using two or three motion vectors from a block which is of the same frame as the current block, wherein a position of the candidate for subblock affine prediction in said list is determined based on whether or not the block which is of the same frame as the current block uses subblock affine prediction, the block of the same frame corresponding to a block at a position A1 at the bottom left of the current block.

2. The method of decoding according to claim 1, further comprising:

selecting a subblock merge mode with subblock affine prediction for the current block, wherein:

the flag is a first flag;

selecting the subblock merge mode with subblock affine prediction comprises decoding a second flag from the bitstream using CABAC decoding; and a context variable for said second flag is determined based on whether or not a first block neighboring said current block uses subblock affine prediction, and whether or not a second block neighboring said current block uses subblock affine prediction.

3. The method of decoding according to claim 2, wherein the first block is located at the left of the current block and the second block is located above the current block.

4. The method of decoding according to claim 1, wherein in a state where the current block has a size of 16×16, the number of subblocks in the current block is 16 and at least one motion vector per subblock in the current block is to be derived by using the two or three motion vectors in subblock affine prediction.

5. The method of decoding according to claim 1, wherein the temporal motion vector candidate uses a motion vector in a block which is part of an image different from the image including the current block.

6. A method of encoding an image into a bitstream using motion prediction, the method comprising:

determining, from a plurality of prediction modes including an intra mode and an inter mode, a prediction mode used to encode a current block of the image;

including in the bitstream a flag being capable of indicating that the current block is not skipped;

including in the bitstream prediction mode information used to determine whether a prediction mode for the current block is the intra mode or the inter mode, when the flag indicates that the current block is not skipped;

compiling a list of candidate motion predictors in the case where the inter mode is determined for the current block; and placing a candidate for subblock affine prediction as a merge candidate lower in said list than a temporal motion vector candidate, the subblock affine prediction deriving at least one motion vector per subblock in the current block by using two or three motion vectors from a block which is of the same frame as the current block, wherein a position of the candidate for subblock affine prediction in said list is determined based on whether or not the block which is of the same frame as the current block uses subblock affine prediction, the block of the same frame corresponding to a block at a position A1 at the bottom left of the current block.

7. The method of encoding according to claim 6, further comprising selecting a subblock merge mode with subblock affine prediction for the current block, wherein:

the flag is a first flag;

selecting the subblock merge mode with subblock affine prediction comprises encoding a second flag into the bitstream using CABAC coding; and a context variable for said second flag is determined based on whether or not a first block neighboring said current block uses subblock affine prediction, and whether or not a second block neighboring said current block uses subblock affine prediction.

8. The method of encoding according to claim 7, wherein the first block is located at the left of the current block and the second block is located above the current block.

9. The method of encoding according to claim 6, wherein in a state where the current block has a size of 16×16, the number of subblocks in the current block is 16 and at least one motion vector per subblock in the current block is to be derived by using the two or three motion vectors in subblock affine prediction.

10. The method of encoding according to claim 6, wherein the temporal motion vector candidate uses a motion vector in a block which is part of an image different from an image including the current block.

11. An encoder for encoding an image into a bitstream using motion prediction, the encoder comprising at least one processor configured to function as:

a unit configured to determine, from a plurality of prediction modes including an intra mode and an inter mode, a prediction mode used to encode a current block of the image;

a unit configured to include in the bitstream a flag being capable of indicating that the current block is not skipped;

a unit configured to include in the bitstream prediction mode information used to determine whether a prediction mode for the current block is the intra mode or the inter mode, when the flag indicates that the current block is not skipped;

a unit configured to compile a list of candidate motion predictors in the case where the inter mode is determined for the current block; and a unit configured to place a candidate for subblock affine prediction as a merge candidate lower in said list than a temporal motion vector candidate, the subblock affine prediction deriving at least one motion vector per subblock in the current block by using two or three motion vectors from a block which is of the same frame as the current block, wherein a position of the candidate for subblock affine prediction in said list is determined based on whether or not the block which is of the same frame as the current block uses subblock affine prediction, the block of the same frame corresponding to a block at a position A1 at the bottom left of the current block.

12. A decoder for decoding an image from a bitstream encoded using motion prediction, the decoder comprising at least one processor configured to function as:

a unit configured to decode a flag being capable of indicating that a current block is not skipped;

a unit configured to decode prediction mode information used to determine whether a prediction mode for the current block is an intra mode or an inter mode, when the flag indicates that the current block is not skipped;

a unit configured to determine, from a plurality of prediction modes including the intra mode and the inter mode, the prediction mode used to decode the current block of the image, based on the prediction mode information;

a unit configured to compile a list of candidate motion predictors in the case where the inter mode is determined for the current block; and a unit configured to place a candidate for subblock affine prediction as a merge candidate lower in said list than a temporal motion vector candidate, the subblock affine prediction deriving at least one motion vector per subblock in the current block by using two or three motion vectors from a block which is of the same frame as the current block, wherein a position of the candidate for subblock affine prediction in said list is determined based on whether or not the block which is of the same frame as the current block uses subblock affine prediction, the block of the same frame corresponding to a block at a position A1 at the bottom left of the current block.

13. A non-transitory computer-readable storage medium storing a program for causing a computer to execute a method of decoding an image from a bitstream encoded using motion prediction, the method comprising:

decoding a flag being capable of indicating that a current block is not skipped;

decoding prediction mode information used to determine whether a prediction mode for the current block is an intra mode or an inter mode, when the flag indicates that the current block is not skipped;

determining, from a plurality of prediction modes including the intra mode and the inter mode, the prediction mode used to decode the current block of the image, based on the prediction mode information;

compiling a list of candidate motion predictors in the case where the inter mode is determined for the current block; and placing a candidate for subblock affine prediction as a merge candidate lower in said list than a temporal motion vector candidate, the subblock affine prediction deriving at least one motion vector per subblock in the current block by using two or three motion vectors from a block which is of the same frame as the current block, wherein a position of the candidate for subblock affine prediction in said list is determined based on whether or not the block which is of the same frame as the current block uses subblock affine prediction, the block of the same frame corresponding to a block at a position A1 at the bottom left of the current block.

14. A non-transitory computer-readable storage medium storing a program for causing a computer to execute a method of encoding an image into a bitstream using motion prediction, the method comprising:

determining, from a plurality of prediction modes including an intra mode and an inter mode, a prediction mode used to encode a current block of the image;

including in the bitstream a flag being capable of indicating that the current block is not skipped;

including in the bitstream prediction mode information used to determine whether a prediction mode for the current block is the intra mode or the inter mode, when the flag indicates that the current block is not skipped;

compiling a list of candidate motion predictors; and placing a candidate for subblock affine prediction as a merge candidate lower in said list than a temporal motion vector candidate, the subblock affine prediction deriving at least one motion vector per subblock in the current block by using two or three motion vectors from a block which is of the same frame as the current block, wherein a position of the candidate for subblock affine prediction in said list is determined based on whether or not the block which is of the same frame as the current block uses subblock affine prediction, the block of the same frame corresponding to a block at a position A1 at the bottom left of the current block.

* * * * *